US010221566B2

(12) United States Patent
von Tagen

(10) Patent No.: US 10,221,566 B2
(45) Date of Patent: Mar. 5, 2019

(54) CYCLORAMA

(71) Applicant: Frederick William von Tagen and Denise M. von Tagen, Trustees of the FREDERICK W. VON TAGEN TRUST, dated March 29, 1994, West Linn, OR (US)

(72) Inventor: Frederick William von Tagen, West Linn, OR (US)

(73) Assignee: Frederick William von Tagen and Denise M. von Tagen, West Linn, OR (US), Trustees of the Frederick W. von Tagen Trust, Dated March 29, 1994

( * ) Notice: Subject to any disclaimer, the term of this patent is extended or adjusted under 35 U.S.C. 154(b) by 0 days.

(21) Appl. No.: 15/425,624

(22) Filed: Feb. 6, 2017

(65) Prior Publication Data

US 2017/0145693 A1 May 25, 2017

Related U.S. Application Data

(63) Continuation-in-part of application No. PCT/US2016/018791, filed on Feb. 19, 2016.
(Continued)

(51) Int. Cl.
*E04C 2/30* (2006.01)
*E04C 2/38* (2006.01)
(Continued)

(52) U.S. Cl.
CPC .................. *E04C 2/30* (2013.01); *E04B 1/32* (2013.01); *E04C 2/38* (2013.01); *G03B 15/06* (2013.01);
(Continued)

(58) Field of Classification Search
CPC ... E04C 2/30; E04C 2/32; E04C 2/328; G03B 15/06; E04B 2001/0061; E04B 2001/3276; B29L 2031/10
See application file for complete search history.

(56) References Cited

U.S. PATENT DOCUMENTS 1,449,877 A * 3/1923 Wolff ........................ A47K 3/02
4/584
2,069,289 A * 2/1937 Swendsen ............... E04F 19/04
52/288.1
(Continued)

FOREIGN PATENT DOCUMENTS

FR 2561791 A1 * 9/1985 ............. G03B 15/06
FR 3020540 A1 * 10/2015 ............. G03B 15/07
WO WO 97/14253 4/1997

OTHER PUBLICATIONS

International Search Report and Written Opinion dated Aug. 3, 2016, for PCT Patent Application No. PCT/US2016/018791, filed Feb. 19, 2016, 14 pp.
(Continued)

*Primary Examiner* — Babajide A Demuren
(74) *Attorney, Agent, or Firm* — Klarquist Sparkman, LLP

(57) ABSTRACT

A panel member for a cyclorama includes a concavo-convex body having integrally-formed first and second side portions with an intermediate portion therebetween. The first side portion, the second side portion, and the intermediate portion have a radius of curvature in a Y-Z plane, and the first and second side portions have a radius of curvature in an X-Y plane that is different from the radius of curvature in the Y-Z plane to uniformly reflect or diffuse sound and light incident on the panel member.

20 Claims, 15 Drawing Sheets

Related U.S. Application Data

(60) Provisional application No. 62/120,788, filed on Feb. 25, 2015, provisional application No. 62/119,026, filed on Feb. 20, 2015, provisional application No. 62/297,749, filed on Feb. 19, 2016.

(51) Int. Cl.
*E04B 1/32* (2006.01)
*G03B 15/06* (2006.01)
*E04B 1/00* (2006.01)
*B29L 31/10* (2006.01)

(52) U.S. Cl.
CPC ... *B29L 2031/10* (2013.01); *E04B 2001/0061* (2013.01); *E04B 2001/3276* (2013.01)

(56) References Cited

U.S. PATENT DOCUMENTS

| | | | | |
|---|---|---|---|---|
| 2,095,533 | A * | 10/1937 | Schmidt | E04C 2/32 72/379.2 |
| 2,274,317 | A * | 2/1942 | Bonnell | E04F 19/0495 4/660 |
| 2,534,146 | A * | 12/1950 | Rodman | A47K 3/02 4/589 |
| 2,994,905 | A * | 8/1961 | Franker, Jr. | E04F 19/0495 16/16 |
| 4,092,810 | A | 6/1978 | Sumner | |
| 4,872,031 | A * | 10/1989 | Baliozian | G03B 15/06 396/3 |
| 4,893,447 | A | 1/1990 | Opp et al. | |
| 4,951,076 | A * | 8/1990 | Baillie-Hamilton | G03B 15/06 352/88 |
| 4,965,970 | A | 10/1990 | Nania | |
| 6,093,109 | A * | 7/2000 | Eden | A63C 19/10 472/90 |
| 6,216,288 | B1 * | 4/2001 | Bernau | E03C 1/24 4/680 |
| 6,401,418 | B1 * | 6/2002 | Senn | E04F 19/04 52/287.1 |
| 6,470,631 | B1 * | 10/2002 | Rechsteiner | A63C 19/10 14/69.5 |
| 9,046,740 | B1 * | 6/2015 | Smithweck | G03B 15/06 |
| 2005/0011159 | A1 * | 1/2005 | Standal | B28B 1/14 52/716.1 |
| 2008/0134602 | A1 * | 6/2008 | Schick | E04F 19/0486 52/287.1 |
| 2010/0144454 | A1 | 6/2010 | Lokhorst et al. | |
| 2012/0163782 | A1 * | 6/2012 | McColl | G03B 15/06 396/3 |
| 2013/0181901 | A1 * | 7/2013 | West | G09G 5/14 345/161 |
| 2015/0121772 | A1 * | 5/2015 | Berken | E04B 1/34331 52/28 |

OTHER PUBLICATIONS

PDF of https://www.procyc.com/product.php?intID=10, "System 4BI," 2 pp., ProCyc Inc., archived Mar. 30, 2008.
PDF of http://procyc.com/images/userimages/schem_10-2.pdf, System 4BI schematic with expanded corner, 1 p., ProCyc Inc., archived Mar. 30, 2008.

* cited by examiner

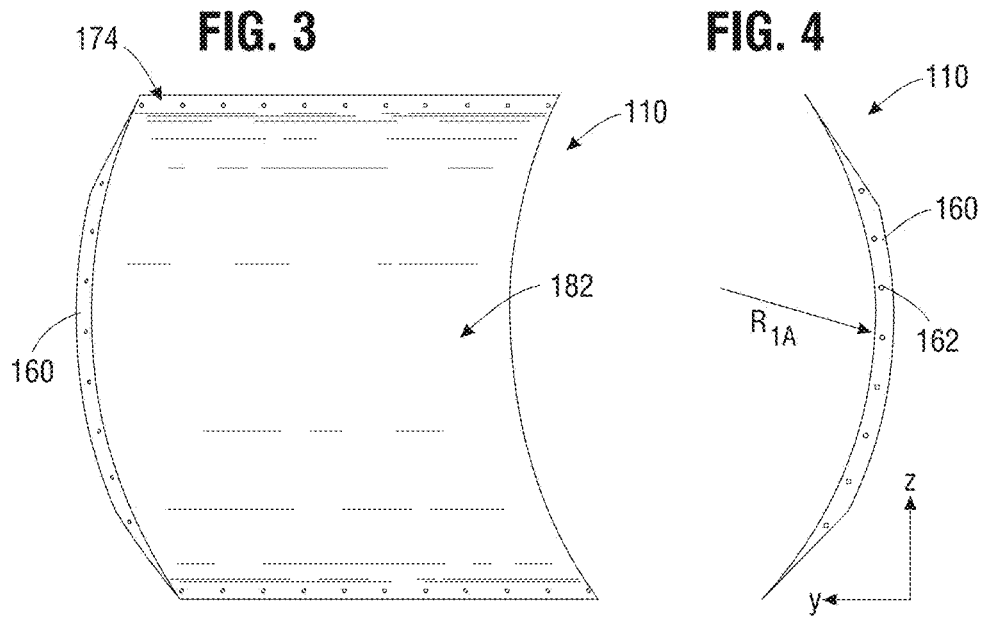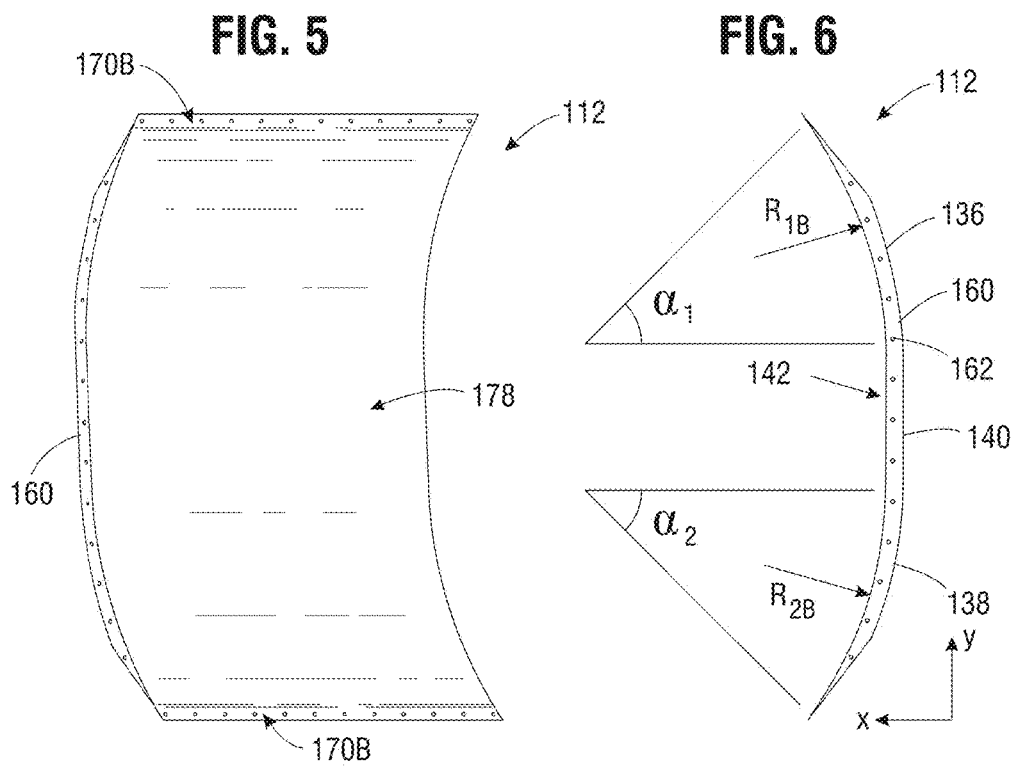

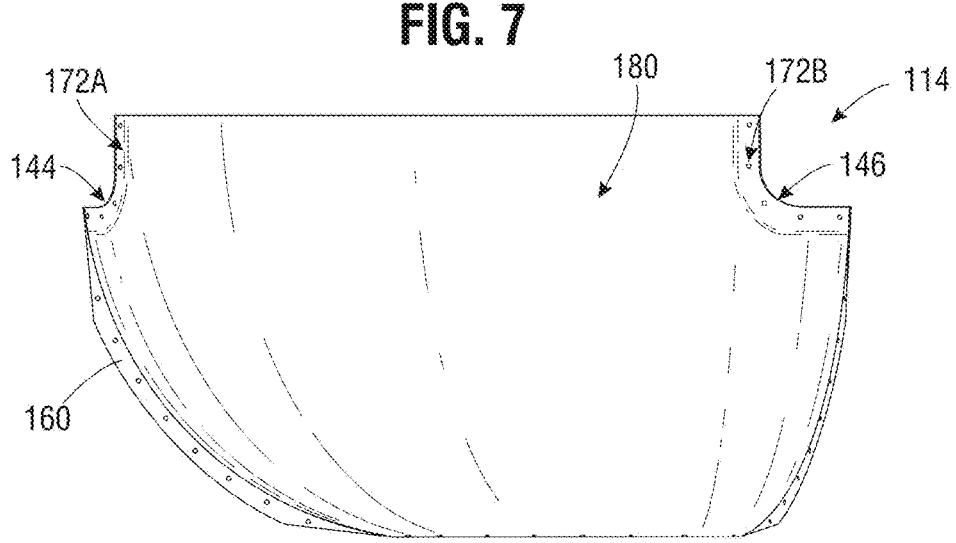
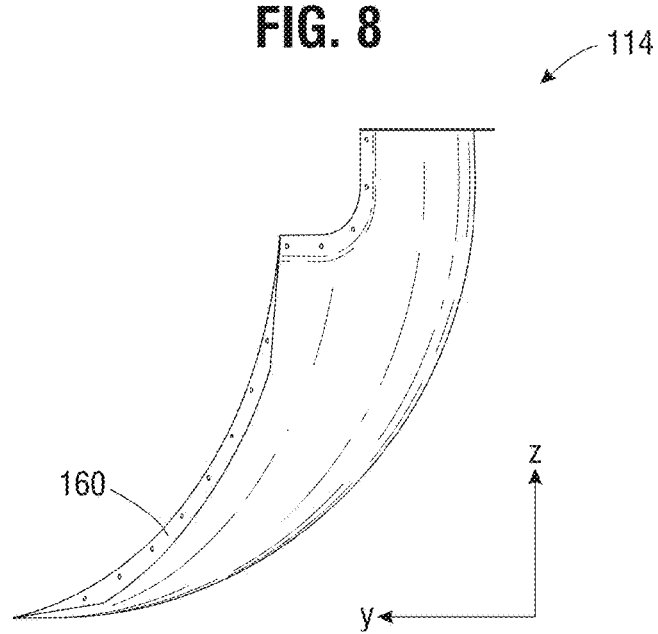

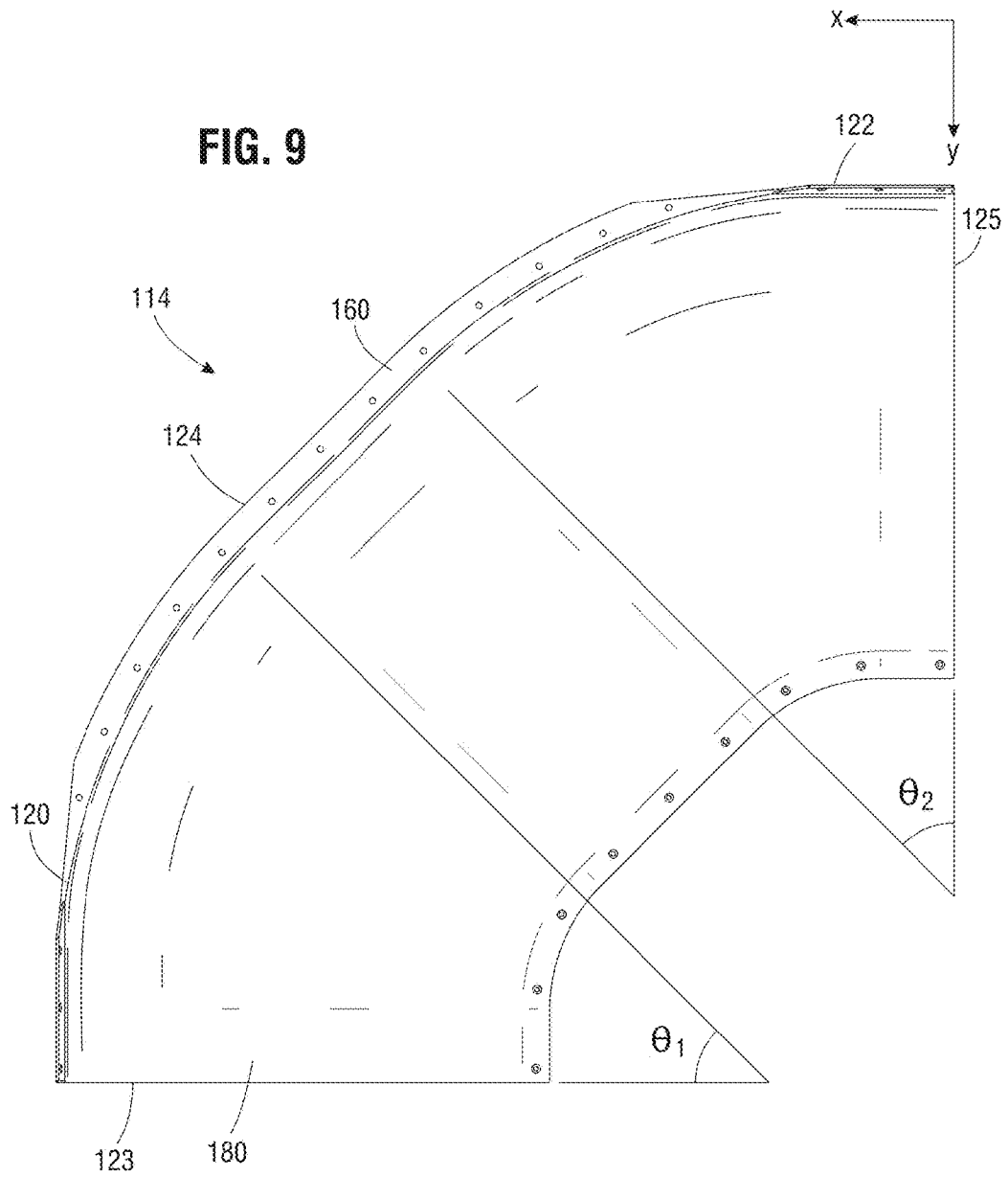

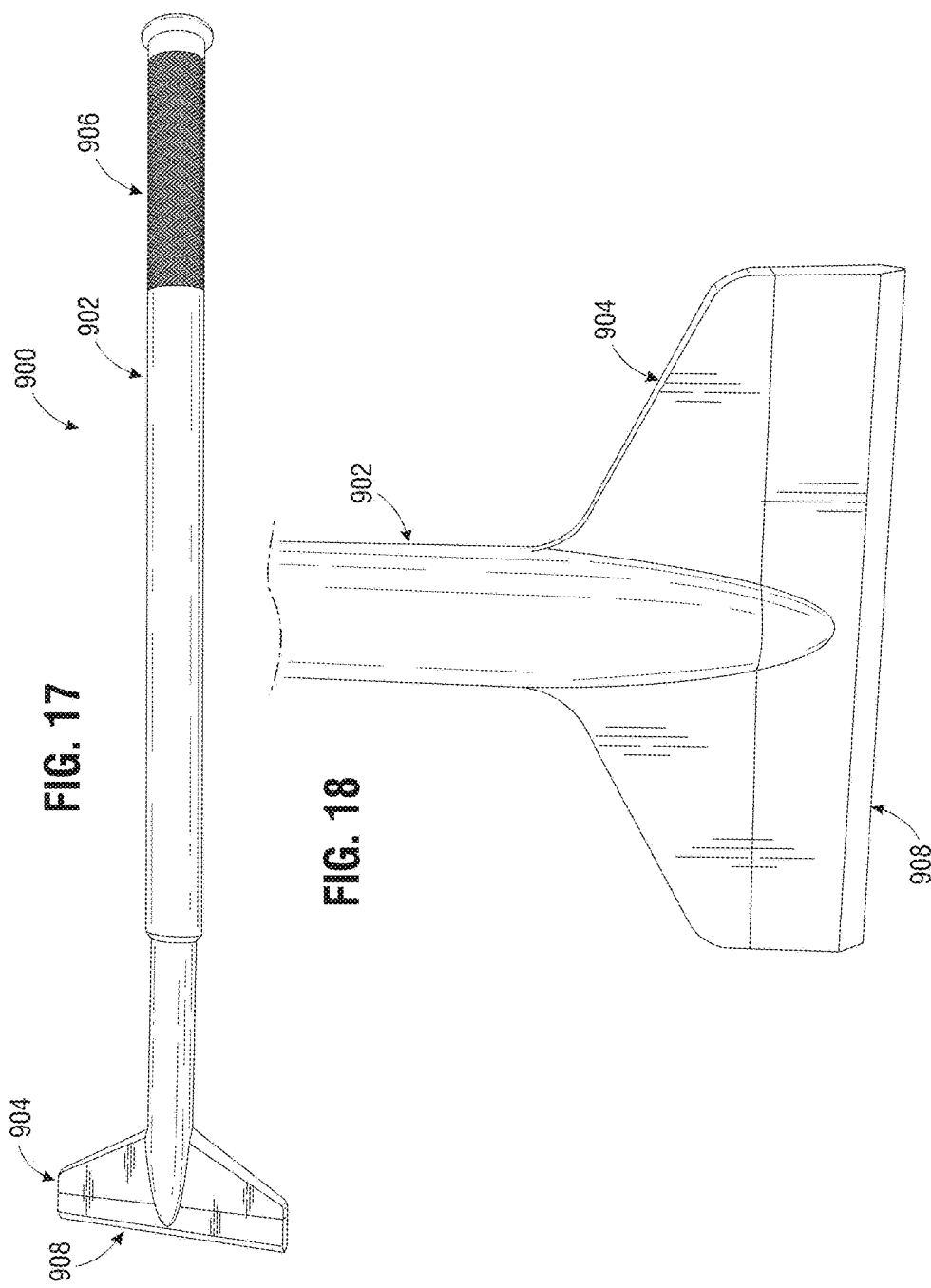

CYCLORAMA

CROSS REFERENCE TO RELATED APPLICATIONS

This application is a continuation-in-part of PCT Patent Application No. PCT/US2016/018791, filed Feb. 19, 2016, which in turn claims the benefit of U.S. Provisional Patent Application No. 62/120,788, filed Feb. 25, 2015, and U.S. Provisional Patent Application No. 62/119,026, filed Feb. 20, 2015, all of which are incorporated herein by reference in their entirety. This application also claims the benefit of U.S. Provisional Patent Application No. 62/297,749, filed Feb. 19, 2016, which is incorporated herein by reference in its entirety.

FIELD

The present disclosure concerns cycloramas, such as for use in photography and film production.

BACKGROUND

Cyclorama structures are useful for creating the appearance of an unlimited space having no horizon or wall intersections in photography and film applications. A cyclorama typically includes two angled walls that meet at a corner, and one or more curved panels or coves extending between the walls to conceal the corner to provide the appearance of an uninterrupted expanse. The cyclorama can also include one or more curved panels extending from the corner to conceal the intersection between the floor and the walls and/or between the walls and the ceiling. However, the curvature of the panels in the corner of a cyclorama is typically such that sound is focused by the panels in particular directions, resulting in amplification of sound along certain sight lines and deadening of sound along other sight lines. Similarly, the panels can reflect and focus light in particular directions, resulting in shadows or uneven lighting of a subject in or near the corner of the cyclorama. Accordingly, there is a need for improved cycloramas.

SUMMARY

Certain disclosed embodiments concern modular panel members for cycloramas, and methods of making, assembling, and using the same. In a representative embodiment, a panel member comprises a concavo-convex body having integrally-formed first and second side portions with an intermediate portion therebetween. The first side portion, the second side portion, and the intermediate portion have a radius of curvature in a Y-Z plane, and the first and second side portions further have a radius of curvature in an X-Y plane that is different from the radius of curvature in the Y-Z plane.

In another embodiment, a method comprises creating an image using a cyclorama including a panel member having a concavo-convex body with integrally-formed first and second side portions and an intermediate portion therebetween. The first side portion, the second side portion, and the intermediate portion have a radius of curvature in a Y-Z plane, and the first and second side portions further have a radius of curvature in an X-Y plane that is different from the radius of curvature in the Y-Z plane.

In another representative embodiment, a cyclorama assembly comprises a first concavo-convex panel member having integrally formed first and second side portions and an intermediate portion therebetween. The first and second side portions and the intermediate portion comprise a first radius of curvature in a Y-Z plane, and the first and second side portions further comprise a second radius of curvature in an X-Y plane that is different from the first radius of curvature in the Y-Z plane. The assembly further comprises a second concavo-convex panel member disposed adjacent one of the first or second side portions of the first concavo-convex panel member. The second concavo-convex panel member comprises the first radius of curvature in the Y-Z plane. The assembly further comprises a third concavo-convex panel member disposed adjacent an upper edge portion of the first concavo-convex panel member. The third concavo-convex panel member comprises integrally formed first and second side portions having the second radius of curvature in the X-Y plane.

In another representative embodiment, a method comprises situating a first concavo-convex panel member between two angled walls. The first concavo-convex panel member has integrally formed first and second side portions and an intermediate portion therebetween. The first and second side portions and the intermediate portion comprise a first radius of curvature in a Y-Z plane, the first and second side portions further comprising a second radius of curvature in an X-Y plane that is different from the first radius of curvature in the Y-Z plane. The method further comprises situating a second concavo-convex panel member adjacent one of the first or second side portions of the first concavo-convex panel member, the second concavo-convex panel member comprising the first radius of curvature in the Y-Z plane. The method further comprises situating a third concavo-convex panel member adjacent an upper edge portion of the first concavo-convex panel member, the third concavo-convex panel member comprising integrally formed first and second side portions having the second radius of curvature in the X-Y plane.

In another representative embodiment, a method of making a panel member comprises applying a moldable material to a mold member, and applying pressure to the moldable material to form a concavo-convex panel member having integrally-formed first and second side portions with an intermediate portion therebetween. The first side portion, the second side portion, and the intermediate portion have a radius of curvature in a Y-Z plane, and the first and second side portions further have a radius of curvature in an X-Y plane that is different from the radius of curvature in the Y-Z plane.

In another representative embodiment, a method of making a panel member comprises introducing a moldable material into a mold cavity to form a concavo-convex panel member. The concave-convex panel member has integrally-formed first and second side portions with an intermediate portion therebetween. The first side portion, the second side portion, and the intermediate portion have a radius of curvature in a Y-Z plane, and the first and second side portions further have a radius of curvature in an X-Y plane that is different from the radius of curvature in the Y-Z plane. The method further comprises removing the panel member from the mold cavity.

In another representative embodiment, a method of disassembling a cyclorama comprises positioning a tool comprising a handle portion and a blade portion such that the blade portion is between a panel member of the cyclorama and a support structure to which the panel member is secured. The method further comprises moving the tool such that the blade portion moves between the panel member and the support structure to unsecure the panel member from the support structure.

In another representative embodiment, a panel member for a cyclorama configured to be situated on a horizontal reference comprises a first concavo-convex wall portion having an upper portion and a lower portion. The upper portion has a first radius of curvature in a plane that is parallel to the horizontal reference, and at least the lower portion has a second radius of curvature in a plane that is perpendicular to the horizontal reference such that the lower portion is configured to slope upwardly from the horizontal reference when the cyclorama is situated on the horizontal reference. The panel member further comprises a second concavo-convex wall portion having an upper portion and a lower portion. The upper portion has the first radius of curvature in a plane that is parallel to the horizontal reference, and at least the lower portion has the second radius of curvature in a plane that is perpendicular to the horizontal reference such that the lower portion is configured to slope upwardly from the horizontal reference when the cyclorama is situated on the horizontal reference. The first radius of curvature is different from the second radius of curvature.

In another representative embodiment, a method of making a panel member for a cyclorama comprises applying a moldable material to a mold member, and applying pressure to the moldable material to form a panel member configured to be situated on a horizontal reference. The panel member comprises a first concavo-convex wall portion having an upper portion and a lower portion. The upper portion has a first radius of curvature in a plane that is parallel to the horizontal reference, and at least the lower portion has a second radius of curvature in a plane that is perpendicular to the horizontal reference such that the lower portion is configured to slope upwardly from the horizontal reference when the cyclorama is situated on the horizontal reference. The panel member further comprises a second concavo-convex wall portion having an upper portion and a lower portion. The upper portion has the first radius of curvature in a plane that is parallel to the horizontal reference, and at least the lower portion has the second radius of curvature in a plane that is perpendicular to the horizontal reference such that the lower portion is configured to slope upwardly from the horizontal reference when the cyclorama is situated on the horizontal reference. The first radius of curvature is different from the second radius of curvature.

In another representative embodiment, a method comprises creating an image using a cyclorama including a panel member configured to be situated on a horizontal reference. The panel member comprises a first concavo-convex wall portion having an upper portion and a lower portion. The upper portion has a first radius of curvature in a plane that is parallel to the horizontal reference, and at least the lower portion has a second radius of curvature in a plane that is perpendicular to the horizontal reference such that the lower portion is configured to slope upwardly from the horizontal reference when the cyclorama is situated on the horizontal reference. The panel member further comprises a second concavo-convex wall portion having an upper portion and a lower portion. The upper portion has the first radius of curvature in a plane that is parallel to the horizontal reference, and at least the lower portion has the second radius of curvature in a plane that is perpendicular to the horizontal reference such that the lower portion is configured to slope upwardly from the horizontal reference when the cyclorama is situated on the horizontal reference. The first radius of curvature is different from the second radius of curvature.

The foregoing and other objects, features, and advantages of the disclosure will become more apparent from the following detailed description, which proceeds with reference to the accompanying figures.

BRIEF DESCRIPTION OF THE DRAWINGS

FIG. 3 is a perspective view of a representative embodiment of a floor-to-wall panel member.

FIG. 4 is a side elevation view of the floor-to-wall panel member of FIG. 3.

FIG. 5 is a perspective view of a representative embodiment of a wall-to-wall panel member.

FIG. 6 is a plan view of the wall-to-wall panel member of FIG. 5.

FIG. 7 is a perspective view of a representative embodiment of a corner panel member.

FIG. 8 is a side elevation view of the corner panel member of FIG. 7.

FIG. 9 is a plan view of the corner panel member of FIG. 7.

FIGS. 17 and 18 are perspective views of a tool for use with the cyclorama panels described herein.

DETAILED DESCRIPTION

Cycloramas comprising a plurality of modular panel members can be useful for quickly setting up, breaking down, or reconfiguring a set or stage for photography or film applications. Exemplary embodiments of cycloramas comprising modular panel members are disclosed in U.S. Pat. No. 4,893,447, which is incorporated herein by reference.

First Representative Embodiment

Figure 1:
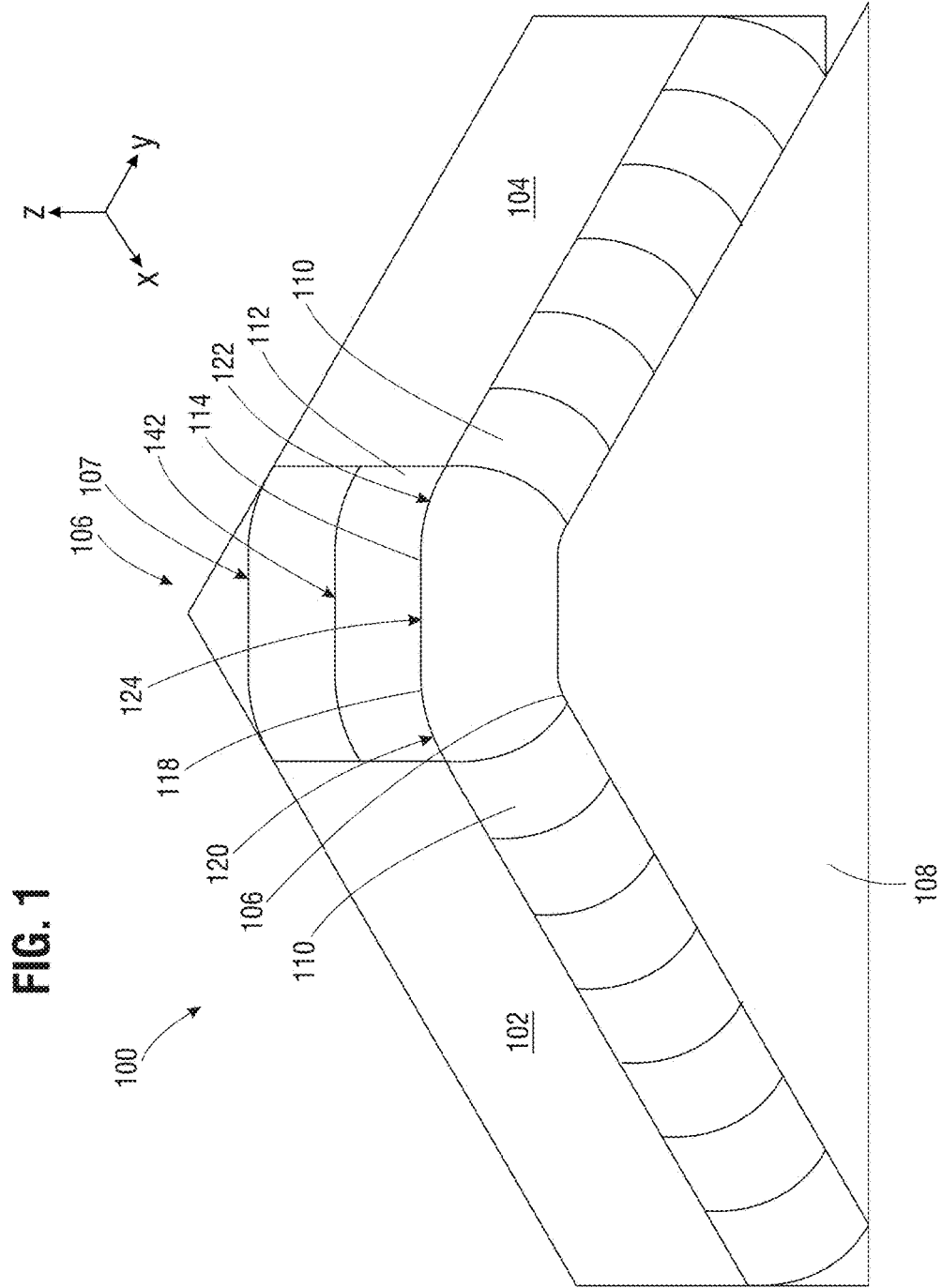
FIG. 1 illustrates a perspective view of a set including a representative embodiment of a cyclorama.

FIG. 1 illustrates a set, such as a film or photography set, including a representative embodiment of a cyclorama 100. The cyclorama can have a support structure configured as first and second walls 102, 104 that intersect one another at a corner 106. The cyclorama 100 can further include an absolute horizontal reference such as a floor 108 extending along an X-Y plane (note Cartesian axes shown), and a corner cove structure generally indicated at 107. A plurality of curved panel members can extend between the walls and/or between the floor and the respective walls to conceal the intersections therebetween to provide the appearance of an unlimited space. For example, the cyclorama can include a plurality of curved floor-to-wall panel members 110 extending between the floor 108 and the respective walls 102, 104 to conceal the intersection between the floor and the walls. Additionally, in some embodiments, the floor-to-wall panel members can be configured to extend between the respective walls 102, 104 and the ceiling of the studio at the top of the cyclorama to conceal the intersection therebetween.

The cyclorama can also include a plurality of curved wall-to-wall panel members 112 extending between the respective walls 102, 104 to form the cove structure 107. The floor-to-wall panel members 110 and the wall-to-wall panel members 112 can be modular. Accordingly, the cyclorama can be constructed having any suitable length and/or height dimensions, and can be couplable to one another and/or to the respective walls to facilitate assembly and disassembly.

The cyclorama can further include a curved corner panel member 114 to which the adjacent floor-to-wall panel members 110 and the adjacent wall-to-wall panel members 112 can be coupled. In certain embodiments, the corner panel member can have a concavo-convex shape, with the concave surface facing away from the walls 102, 104 and the convex surface facing toward the walls. The corner panel member 114 can extend horizontally between the walls 102, 104, and vertically between the floor 108 and the respective walls 102, 104 such that a lower edge 116 contacts and/or is secured to the floor and at least a portion of an upper edge 118 contacts and/or is secured to the walls.

Figure 2:
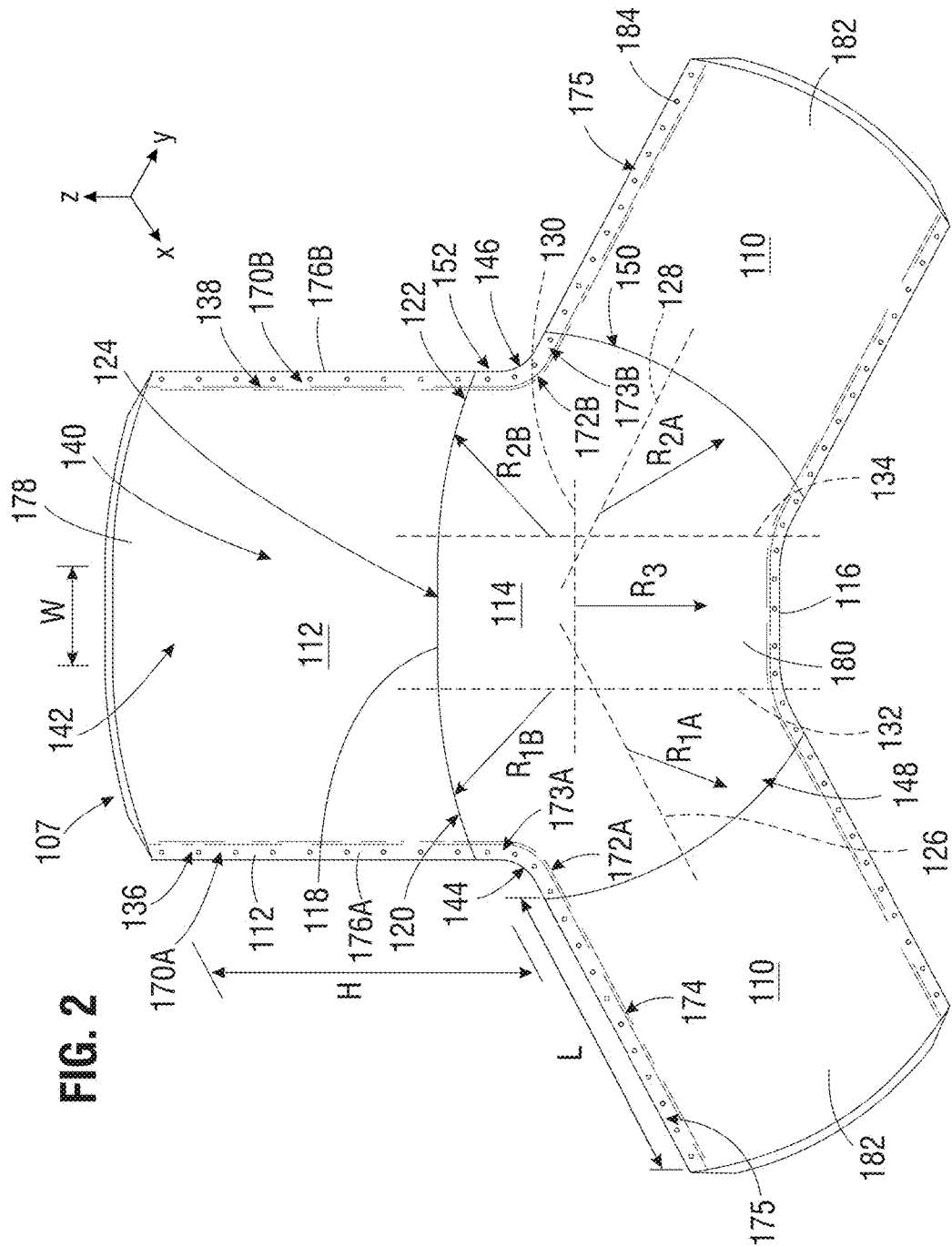
FIG. 2 is a side elevation view illustrating an embodiment of a cyclorama assembly including a corner panel member, a floor-to-wall panel member, and a wall-to-wall panel member.

As illustrated in FIG. 2, the corner panel member 114 can include first and second side portions 120, 122, and an intermediate portion 124 therebetween. The first side portion 120, the second side portion 122, and the intermediate portion 124 can be integrally formed with one another such that the corner panel member 114 comprises a one-piece unitary construction. The first and second side portions 120, 122, and the intermediate portion 124, can be curved in the Y-Z plane such that the corner panel member can conceal the intersection of the floor and the walls at the corner 106. To this end, the first and second side portions 120, 122, and the intermediate portion 124 can each have a radius of curvature illustrated with respect to horizontal axes corresponding to each respective portion.

For example, the first side portion 120 can have a radius of curvature $R_{1A}$ illustrated with respect to a horizontal axis 126 such that the portion of the lower edge 116 associated with the first side portion contacts the floor and the portion of the upper edge 118 associated with the first side portion contacts the wall 102 (see FIG. 1). The second side portion 122 can have a radius of curvature $R_{2A}$ illustrated with respect to a horizontal axis 128 such that the portion of the lower edge 116 associated with the second side portion 122 contacts the floor 108 and the portion of the upper edge 118 associated with the second side portion contacts the wall 104. The intermediate portion 124 can also have a radius of curvature $R_3$ illustrated with respect to a horizontal axis 130 such that the portion of the lower edge 116 associated with the intermediate portion contacts the floor 108 and the portion of the upper edge 118 associated with the intermediate portion extends between the walls 102, 104. In the illustrated embodiment, the radii of curvature $R_{1A}$, $R_{2A}$, and $R_3$ of the first side portion, the second side portion, and the intermediate portion, respectively, can be substantially equal such that the upper and lower edges 118, 116 of the corner panel member are continuous along the floor and between the walls, respectively. In certain embodiments, the first and second side portions 120, 122 and the intermediate portion 124 can have respective degrees of curvature of between about 60 to about 90 degrees in the Y-Z plane. In certain embodiments, the first, second, and intermediate portions can be non-parabolic.

In addition to the curvature in the Y-Z plane, the first and second side portions 120, 122 can also be curved in the X-Y plane. For example, the first side portion 120 can have a radius of curvature $R_{1B}$ defined with respect to a vertical axis 132, and the second side portion 122 can have a radius of curvature $R_{2B}$ defined with respect to a vertical axis 134. In this manner, the first and second side portions 120, 122 can extend in a curvilinear fashion from the intermediate portion 124 to contact the respective walls 102, 104 and respective floor-to-wall panel members 110. In the illustrated embodiment, the radii of curvature $R_{1B}$, $R_{2B}$ can be substantially equal such that the first and second side portions 120, 122 can be symmetrical about the intermediate portion 124. In certain embodiments, the first and second side portions 120, 122 can have respective degrees of curvature substantially equal to angles defined between the walls 102, 104 and the intermediate portion 124. For example, with reference to FIG. 9, the first side portion 120 can define an angle $\theta_1$ between the intermediate portion 124 and an edge 123 of the first side portion. In certain embodiments, the angle $\theta_1$ can be from about 20 to about 60 degrees, depending upon the angle of the walls. In some embodiments, the angle $\theta_1$ can be about 45 degrees.

The second side portion 122 can also define an angle $\theta_2$ between the intermediate portion 124 and the respective edge 125 of the second side portion. In certain embodiments, the angle $\theta_2$ can be from about 20 degrees to about 60 degrees. In some embodiments, the angle $\theta_2$ can be about 45 degrees. In this manner, the first and second side portions together can provide a degree of curvature of about 90 degrees.

In the illustrated embodiment, the curvature of the first and second side portions and the intermediate portion in the Y-Z plane and the curvature of the first and second side portions in the X-Y plane can be different. In other words, the radii $R_{1A}$, $R_{2A}$, and $R_3$ can be equal to one another, but unequal to the radii $R_{1B}$ and $R_{2B}$. By making the radii of curvature in the Y-Z plane different from the radii of curvature in the X-Y plane, light incident on the corner panel member 114 is more uniformly reflected or diffused from the corner of the cyclorama, rather than focused along particular sight lines, as in many cyclorama structures with equal radii in the X-Y and Y-Z planes. This reduces or substantially eliminates shadows, and facilitates more even lighting of the panels of the cyclorama. The unequal radii of curvature in the Y-Z plane as compared to the X-Y plane can also provide more uniform sound propagation from the corner cove 107 by reflecting or dispersing sound incident on the corner panel member 114. This can reduce sound amplification along particular sight lines and sound deadening along certain other sight lines relative to the corner cove 107.

For example, in some embodiments, a ratio between the radius of curvature of the first and second side portions in the X-Y plane and the radius of curvature of the first and second side portions and the intermediate portion in the Y-Z plane can be from about 1.1:1 to about 10:1, such as about 1.1:1 to about 3:1, about 1.1:1 to 2:1, about 1.1:1 to 1.5:1, or about 1.2:1. Thus, in one representative embodiment, the radii $R_{1B}$ and $R_{2B}$ can be about 36 inches, and the radii $R_{1A}$, $R_{2A}$, and $R_3$ can be about 30 inches. In another representative embodiment, the radii $R_{1B}$ and $R_{2B}$ can be about 48 inches, and the radii $R_{1A}$, $R_{2A}$, and $R_{3A}$ can be about 40 inches. A person of ordinary skill in the art will understand, however, that the radii can have any suitable dimensions. Additional perspective and side elevation views of the corner panel member 114 are illustrated in FIGS. 7 and 8, respectively.

In the embodiment of FIG. 2, the floor-to-wall panel members 110 can comprise a radius of curvature in the Y-Z plane equal to the radii $R_{1A}$, $R_{2A}$, and $R_{3A}$ such that the lower edges are flush with the floor 108 and the upper edges are at substantially the same height as the upper edge 118 of the corner panel member 114. In certain embodiments, the floor-to-wall panel members can have a degree of curvature that is substantially equal to an angle defined between the floor and the walls (e.g., between about 60 to about 90 degrees). FIGS. 3 and 4 illustrate perspective and side elevation views of a representative floor-to-wall panel member 110.

In the embodiment of FIG. 2, the wall-to-wall panel members 112 can extend between the walls 102, 104, and can define respective first and second side portions 136, 138. The side portions 136, 138 of the wall-to-wall panel members can be curved in the X-Y plane to interface with the respective walls 102, 104, and to conceal the intersection of the walls at the corner 106. Thus, the respective side portions 136, 138 can have radii of curvature in the X-Y plane substantially equal to the radii $R_{1B}$ and $R_{2B}$ of the corner panel member 114. This can allow the wall-to-wall panel members 112 to interface with the upper edge 118 of the corner panel member 114 to form the corner cove 107. Because the wall-to-wall panel members 112 extend upwardly from the corner panel member 114, they need not be curved in the Y-Z plane. FIGS. 5 and 6 illustrate respective perspective and plan views of a representative embodiment of a wall-to-wall panel member 112.

The wall-to-wall panel members 112 can further comprise an intermediate portion 140 corresponding substantially to the intermediate portion 124 of the corner panel member 114, as best shown in FIGS. 2 and 6. As illustrated in FIGS. 1, 2, 5, and 6, the intermediate portion 140 is not curved in the Y-Z plane such that the combined intermediate portions 140 of one or more wall-to-wall panel members 112 (see, e.g., FIG. 1) define a planar region 142 extending substantially along the center of the corner cove structure 107. The planar region 142 can have any suitable width and/or height, and can disperse or disrupt the transmission of sound waves and/or light waves reflected into the cove 107 by the curved side portions of the wall-to-wall panel members and the corner panel member. In particular embodiments, the planar region 142 can have a width W of from about 1 inch to about 120 inches (FIG. 2). In some embodiments, the width dimension W can be from about 1 inch to about 48 inches. In some embodiments, the width dimension W can be about 12 inches.

In certain embodiments, the side portions 136, 138 of the wall-to-wall panels can have respective degrees of curvature substantially equal to angles formed between the respective walls 102, 104 and the intermediate portion 140. For example, with reference to FIG. 6, the first side portion 136 can define an angle $\alpha_1$ between the intermediate portion 140 and the edge of the first side portion 136. The angle $\alpha_1$ can be from about 20 to about 60 degrees. In some embodiments, the angle $\alpha_1$ can be about 45 degrees, similar to the angle $\theta_1$ of the first side portion of the corner panel member 114. The second side portion 138 can also define an angle $\alpha_2$ between the intermediate portion 140 and the edge of the second side portion. The angle $\alpha_2$ can be from about 20 to about 60 degrees. In some embodiments, the angle $\alpha_2$ can be about 45 degrees, similar to the angle $\theta_2$ of the second side portion of the corner panel member 114.

As stated above, the modular floor-to-wall panel members 110 and wall-to-wall panel members 112 can be couplable to the corner panel member 114, to the floor 108 and/or the walls 102, 104, and/or to one another to facilitate assembly and disassembly. In some embodiments, the panel members can be coupled to one another by any suitable means such as fasteners, any of various mating flange or keyway arrangements, etc. For example, in the illustrated embodiment, the panel members can comprise flanges 160 located on the sides of the panel members (see, e.g., FIGS. 3-8). The flanges 160 can define a plurality of openings 162 for receiving fasteners to fasten adjacent panel members to one another. The flanges also serve to provide integrity and strength to the corner cove assembly to help ensure that the panel members retain the desired curvature along the length of the interfaces between respective panel members.

In some embodiments, the panel members can also be coupled to the respective walls 102, 104 instead of, or in addition to, the adjacent panel members. In the illustrated embodiment, the first and second side portions 120, 122 of the corner panel member 114 can include respective notch portions 144, 146 such that the corner panel member defines respective lateral edge portions 148, 150 and an upper edge portion 152 comprising the edge 118. The flanges 160 of the corner panel member can extend from the notch portions 144, 146, as illustrated in FIGS. 7 and 8. In this manner, the corner panel member 114 can interface with and/or be coupled to the adjacent floor-to-wall panel members 110 and/or the adjacent wall-to-wall panel member 112.

In certain embodiments, the panel members can include peripheral recessed portions extending along the perimeter of the panel members. For example, with reference to FIG. 2, the wall-to-wall panel member 112 can include recessed portions 170A, 170B extending along the respective side portions 136, 138. The corner panel member 114 can include recessed portions 172A, 172B located along the periphery of the notches 144, 146 of the first and second side portions 120, 122, respectively. The floor-to-wall panel members 110 can include recessed portions 174 extending along at least the upper edge of the panel members. The respective panel members can also comprise respective primary surfaces. For example, the panel member 112 can comprise a primary surface 178, the panel member 114 can comprise a primary surface 180, and the panel members 110 can include respective primary surfaces 182.

Proceeding specifically with reference to the wall-to-wall panel 112 for purposes of illustration, the recessed portions 170A, 170B can extend a specified distance from the edge of the panel member 112 (e.g., 2 inches), and can define secondary surfaces 176A, 176B offset from the primary surface 178 (e.g., in the direction of the walls 102, 104 of FIG. 1, respectively). The recessed portions of the panel member 114 and the panel members 110 can also define secondary surfaces (e.g., 173A-173B and 175, respectively) offset from the primary surfaces of the respective panel members. In some embodiments, the secondary surfaces 176A, 176B can be offset from the primary surface by a specified depth (e.g., about 1/8 inch). The depth can be related to a thickness of one or more materials (e.g., tape such as sheetrock tape, mud, plaster, etc.) that may be applied to the secondary surfaces when assembling the cyclorama. By making the depth of the recessed portions 170A, 170B approximately equal to the thickness of the materials to be applied to the recesses when the panels are assembled, the surface of those materials in the recessed portions can be made substantially even with the primary surface 178 after assembly. Thus, the panels can be joined, taped, mudded, and otherwise finished such that the interfaces between adjacent panel members, the floor, and/or the walls are covered, obscured, or otherwise rendered substantially undiscernable in the finished cyclorama.

For example, as illustrated in FIG. 2, the recessed portion 170A of the panel member 112, the recessed portion 172A of the panel member 114, and the recessed portion 174 of the respective panel member 110 can be contiguous when the panels are assembled. When tape and/or mud are applied to the secondary surfaces of the respective recessed portions, the surface of the tape and/or mud along the extent of the contiguous recessed portions can be made substantially even with the primary surfaces 178, 180, 182. In this manner, the interfaces between the respective panel members 112, 114, 110, and between the panel members and the walls, can be covered, obscured, or otherwise rendered substantially undiscernable. It should be understood that the panel members can include recessed portions along any suitable edge portion, including edge portions interfacing with the floor, the walls, the ceiling, and/or with adjacent panel members. Furthermore, the recessed portions can have any suitable width dimension and/or depth dimension. As illustrated in FIGS. 2-8, the secondary surfaces of the recessed portions can also include holes or openings 184 to accept fasteners 185 (e.g., nails, screws, etc.) to fasten the panel members to the floor and/or to the walls.

In some embodiments, the panel members described herein can comprise, for example, any of various moldable materials, such as polymers, plastics, such as ABS plastic, resin, fiberglass, or foam, to name a few. The panel members can also be made from any machine-workable material, including any of various metals (e.g., aluminum), foam, wood, etc. Certain disclosed working embodiments were made from ABS plastic and fiberglass.

In a representative embodiment, the wall-to-wall panel members 112 can have a height dimension H of about 48 inches, and the floor-to-wall panel members can have a length dimension L of about 48 inches, although the panel members can have any suitable height and length dimensions, as desired. An exemplary embodiment can include two wall-to-wall panel members 112, a corner panel member 114, and seven or eight floor-to-wall panel members 110, although a person of ordinary skill will understand that this is variable, and that the disclosed cycloramas can include any suitable number of the various panel members.

In some embodiments, the panel members can be made by, for example, introducing (e.g., as by injection molding) a moldable material into a mold cavity having the shape of the desired panel, and removing the panel from the mold cavity after allowing the material to cure. In some embodiments, the panel members can be made by applying a moldable material to the exterior of a mold member having a surface comprising the shape of the desired panel member, and forming the material into the shape of the mold member. Moldable material such as fiberglass can be applied to the surface of the mold member together with a resin, and pressure can be applied to the moldable material by, for example, placing the mold in a vacuum bag and drawing a vacuum such that the moldable material is urged against the surface to form a panel member having the shape of the mold. In some embodiments, resin can be applied to the form, moldable material such as fiberglass can be applied to the form over the resin, and the combination can be drawn against the form by application of vacuum.

Figure 10:
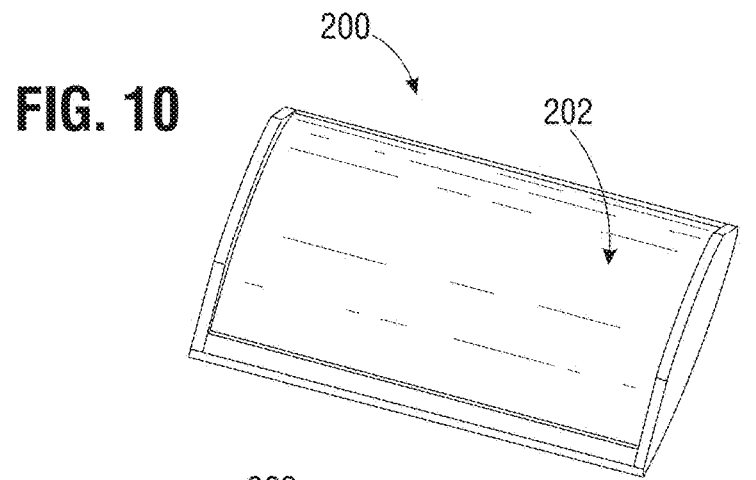
FIG. 10 is a perspective view of a representative embodiment of a mold member for making a floor-to-wall panel member.
Figure 11:
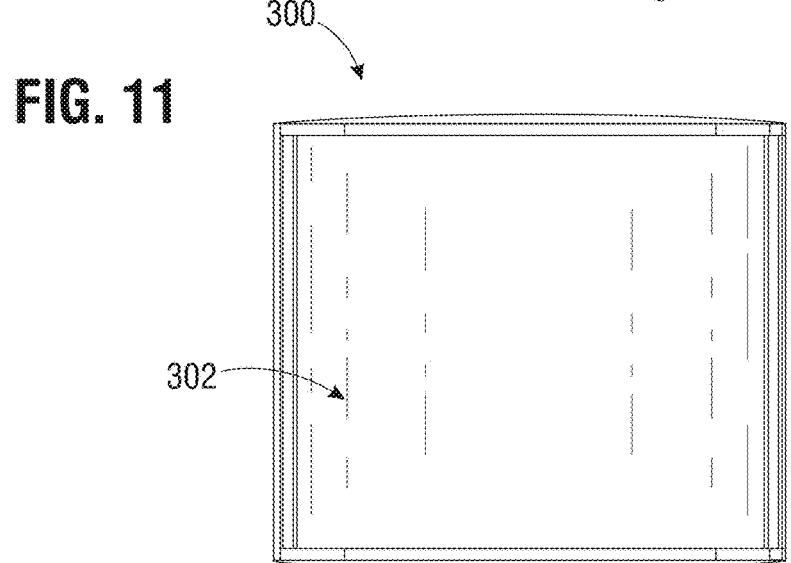
FIG. 11 is a side elevation view of a representative embodiment of a mold member for making a wall-to-wall panel member.
Figure 12:
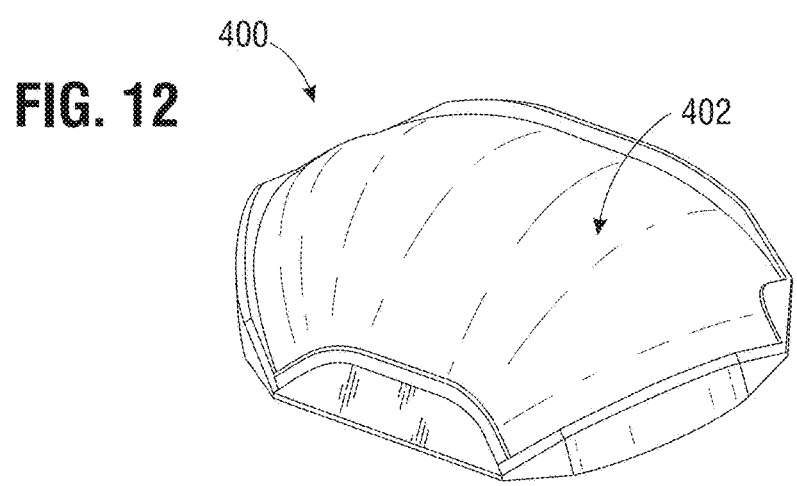
FIG. 12 is a perspective view of a representative embodiment of a mold member for making a corner panel member.

For example, FIG. 10 illustrates a representative embodiment of a mold member 200 having a surface 202 comprising the shape of a floor-to-wall panel member. By way of further example, FIG. 11 illustrates a representative embodiment of a mold member 300 having a surface 302 comprising the shape of a wall-to-wall panel member. By way of further example, FIG. 12 illustrates a representative embodiment of a mold member 400 having a surface 402 comprising the shape of a corner panel member. When making a panel member, moldable material can be applied to the surface of the appropriate mold member, and the moldable material can be urged or otherwise caused to conform to the shape of the surface by applying pressure to the material. In certain examples, pressure can be applied to the moldable material by placing the mold member in a vacuum bag and drawing a vacuum in the bag. In other examples, the moldable material can be caused to conform to and take on the shape of the mold member by vacuum forming, in which the moldable material is urged against the surface of the mold member by a vacuum drawn through one or more openings in the surface of the mold member to form a respective floor-to-wall, wall-to-wall, or corner panel member.

Figure 13:
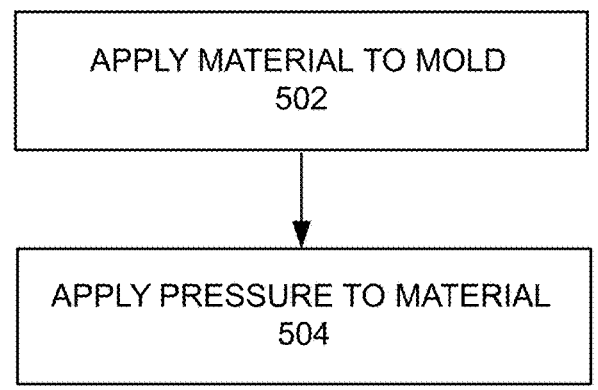
FIG. 13 is a process flow diagram illustrating a representative embodiment of a method of making a panel member.

FIG. 13 is a process flow diagram illustrating a representative embodiment of a method of making a panel member. Although the method proceeds with reference to the corner panel mold member 400 for purposes of illustration, it should be understood that the method can be used in combination with any of the mold members described herein.

At block 502, a moldable material can be applied to a mold member, such as the mold member 400.

At block 504, pressure can be applied to the moldable material to form a concavo-convex panel member having integrally-formed first and second side portions with an intermediate portion therebetween. The first side portion, the second side portion, and the intermediate portion can have a radius of curvature in a Y-Z plane, and the first and second side portions can have a radius of curvature in an X-Y plane that is different from the radius of curvature in the Y-Z plane. The corner panel member can then be removed from the mold member 400 for post-processing, such as trimming excess material, finishing, polishing, etc., as necessary. In alternative embodiments, a panel member having the desired shape can be milled from a block or billet of material, or stamped from sheet stock.

Figure 14:
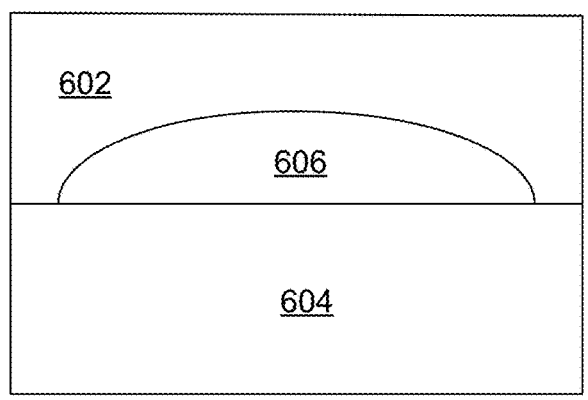
FIG. 14 is a side view of another embodiment of a mold member.

In another embodiment, any of the panel members described herein can be made in an injection molding process. FIG. 14 illustrates a representative embodiment of mold 600 including first and second portions 602, 604. The first mold portion 602 can define a mold cavity 606, which can have the shape of the any of the panel members described herein.

Figure 15:
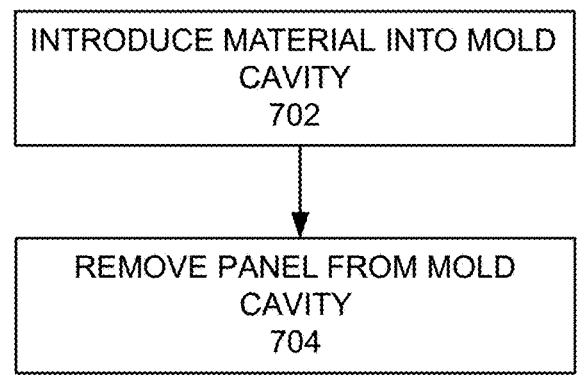
FIG. 15 is a process flow diagram illustrating a representative embodiment of a method of making a panel member using the mold member of FIG. 14.

FIG. 15 is a process flow diagram illustrating another representative embodiment of a method of making a panel member, such as a corner panel member, using the mold 600 of FIG. 14. At block 702, a moldable material can be introduced into a mold cavity to form a concavo-convex panel member having integrally-formed first and second side portions with an intermediate portion therebetween. The first side portion, the second side portion, and the intermediate portion can have a radius of curvature in a Y-Z plane, and the first and second side portions can also have a radius of curvature in an X-Y plane that is different from the radius of curvature in the Y-Z plane.

At block 704, the panel member can be removed from the mold cavity.

The disclosed cyclorama embodiments can provide several surprising and significant advantages over known cycloramas. As stated above, the unequal radii of curvature of the corner panel member 114 in the Y-Z plane as compared to the X-Y plane can reduce or eliminate the focusing of light incident on the corner panel member 114 along particular sight lines, resulting in more uniform lighting of the panel members. This can provide the illusion of an infinite space without a ground or floor, a sky, or a horizon, which can be desirable when creating images (e.g., live film broadcasts, recorded films or movies, or still photographs) of subjects on a set incorporating the cyclorama.

For example, the even lighting of the cyclorama facilitated by the shape of the corner panel member and the other panel members described herein can be crucial when using chroma key composite techniques in green and/or blue screen applications. In such applications, uniform lighting of the cyclorama is required in order to distinguish the cyclorama background from the subject (e.g., a person or product) being imaged. For example, in some chroma key composite techniques, the cyclorama can be painted (e.g., green, blue, etc.). An image of a performer or subject on the set in front of the colored cyclorama can then be distinguished by software and combined (e.g., superposed) with a different background (e.g., a special effect background) that replaces the portions of the image occupied by the colored cyclorama. The unequal radii of curvature in the Y-Z plane as compared to the X-Y plane of the panel members, along with the intermediate portions 124 and 140 of the panel members 114 and 112, respectively, can promote even lighting of the primary surfaces of the panel members, reducing shadows and highlights. This, in turn, can allow the subject to be more readily distinguished from the cyclorama background, which can be critical to achieving a high resolution image of the subject when superposed on the special effect background. For example, the improved ability to distinguish the subject from the cyclorama provided by the panel members described herein can result in a higher resolution image near the edges of the subject, and can also promote higher resolution of fine features, such as the hair of an actor or newscaster, which is typically difficult to distinguish from the background.

The unequal radii of curvature in the Y-Z plane as compared to the X-Y plane of the panel members, and particularly of the corner panel member 114, can also reduce or eliminate the focusing of sound incident on the corner panel member 114 along particular sight lines, resulting in more uniform sound propagation from the corner cove 107. The planar region 142 defined by the intermediate portions of the respective wall panel members 112 can also promote uniform sound propagation from the cove 107 and reduce the amplification or deadening of sound along particular sight lines or trajectories relative to the cyclorama.

Additionally, by integrating the first and second side portions and the intermediate portion of the corner panel member 114 into a single unit, along with the corresponding unitary wall-to-wall panel members 112, the cyclorama 100 can be quickly and easily assembled, disassembled, or reconfigured (e.g., to increase or decrease the dimensions). For example, using a corner panel member 114 in combination with an appropriate number of floor-to-wall and wall-to-wall panel members 110, 112, a cyclorama having walls 12 feet in length and a height of 10 feet can be constructed by a single person in about 1-2 hours. By contrast, other cycloramas of similar dimensions can require two workers 8 hours to construct.

An additional advantage of the modular construction of the cyclorama, and particularly of the unitary construction of the corner panel member and the corresponding unitary wall-to-wall panel members, is that a separate support frame for the panel members apart from the walls is not required. Many cycloramas require erecting a support frame prior to attachment of the panel members. However, because the unitary corner panel member and the wall-to-wall panel members are symmetrical, the panel members can be fastened directly to one another and/or to the walls or the floor of the cyclorama without an additional support frame. This can substantially reduce the time and effort required to construct the cyclorama and/or to reconfigure the cyclorama (e.g., to increase or decrease height and/or length dimensions of the cyclorama) for different applications. By fastening the panel members to one another along the respective flanges, the flanges can also provide structural strength and support to maintain the desired curvature along the length of the panel members.

Another advantage of the embodiments described herein is that by reducing the number of panel members required to construct the cyclorama, the number of joints or interfaces between panels can be reduced. This can provide significant advantages over known systems because slight misalignments between panels can result in undesirable features or defects in the background of a film image or a photographic image that must be corrected or removed (e.g., by software) during production. Such defects can be of particular concern when performing green and/or blue screen imaging techniques. For example, the techniques most commonly used to remove such cyclorama defects from the image involve reducing the resolution of the film or photographic image in order to obscure the defect in the cyclorama. Reducing the resolution of the image also reduces the image quality of the subject. Thus, making the first, second, and intermediate portions of the corner panel members 114 and the wall-to-wall panel members 112 into respective unitary constructions reduces the number of joints between panels and provides a corresponding reduction in the number of defects or artifacts in an image that must be removed or corrected during production.

Figure 16:
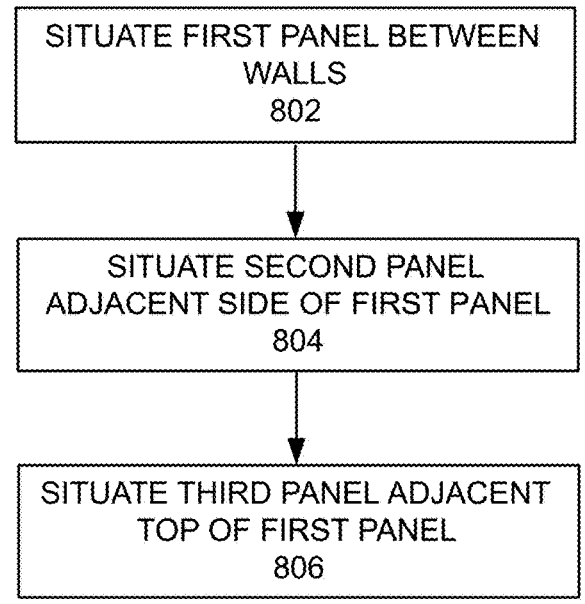
FIG. 16 is a process flow diagram illustrating a representative embodiment of a method of assembling a cyclorama.

FIG. 16 is a process flow diagram illustrating a representative embodiment of a method of assembling a cyclorama using any of the panel member embodiments described herein. At block 802 a first concavo-convex panel member can be situated between two angled walls. The first concavo-convex panel member can have integrally formed first and second side portions and an intermediate portion therebetween, and can have radii of curvature in the Y-Z plane and the X-Y plane that are unequal, as described above.

At block 804, a second concavo-convex panel member can be situated adjacent one of the first or second side portions of the first concavo-convex panel member. The second concavo-convex panel member can comprise the first radius of curvature in the Y-Z plane.

At block 806, a third concavo-convex panel member can be situated adjacent an upper edge or top portion of the first concavo-convex panel member. The third concavo-convex panel member can comprise integrally formed first and second side portions having the second radius of curvature in the X-Y plane.

In some embodiments, at least one floor-to-wall panel member configured as a wall-to-ceiling panel member can be disposed between a respective wall and a ceiling of the cyclorama. Additional floor-to-wall, wall-to-wall, and/or wall-to-ceiling panel members can be added to the cyclorama to achieve the desired dimensions.

When the panel members have been positioned and secured to the walls, the floor, and/or to one another, any spaces or seams between adjacent panel members can be concealed. For example, the recesses and any spaces between adjacent panel members can be concealed with fiberglass tape, and finished with a joint compound or "topping mud" (e.g., CGC or USG Durabond® Brand 90 Setting-Type Joint Compound available from CGC Corporation). The panel members can then be sanded, sealed, and painted, as desired. In some embodiments, the joints or spaces between panel members can be concealed only with joint compound.

FIGS. 17 and 18 illustrate a representative embodiment of a tool 900. The tool 900 can be, for example, a chisel, and can comprise a handle portion 902 and a blade portion 904. The handle portion 902 can have a grip portion 906, which can be knurled to allow a user to grip the grip portion without slipping. The blade portion 904 can include a blade edge 908, which can be made from any suitable metal material such as hardened steel. In some embodiments, the blade portion 904 can be removable for servicing or replacement. In other embodiments, the blade portion can be secured or integrally formed with the handle portion. The tool 900 is useful for, for example, quickly and efficiently disassembling a cyclorama. For example, by moving the blade edge 908 between an edge portion of a panel member and a substrate (e.g., a floor or wall to which the panel member is secured), the blade edge can cut through or sever fasteners, tape, mud, etc., holding the panel to the substrate. This can be particularly advantageous for removing fasteners because they are frequently covered by mud, tape, etc., applied to the panel members over top of the fasteners, making location and removal of the fasteners difficult and time-consuming.

Figure 19:
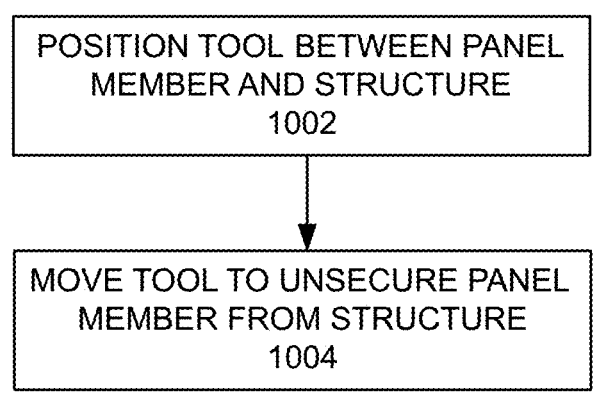
FIG. 19 is a process flow diagram illustrating a representative embodiment of a method of using the tool of FIGS. 17 and 18.

A representative method of disassembling a cyclorama using the tool 900 is described with reference to the process flow diagram illustrated in FIG. 19. At block 1002, a user can position the tool such that the blade edge is between a panel member of a cyclorama and a support structure to which the panel member is secured.

At block 1004, the user can move the tool such that the blade edge moves between the panel member and the support structure to unsecure the panel member from the support structure.

Second Representative Embodiment

Figure 20:
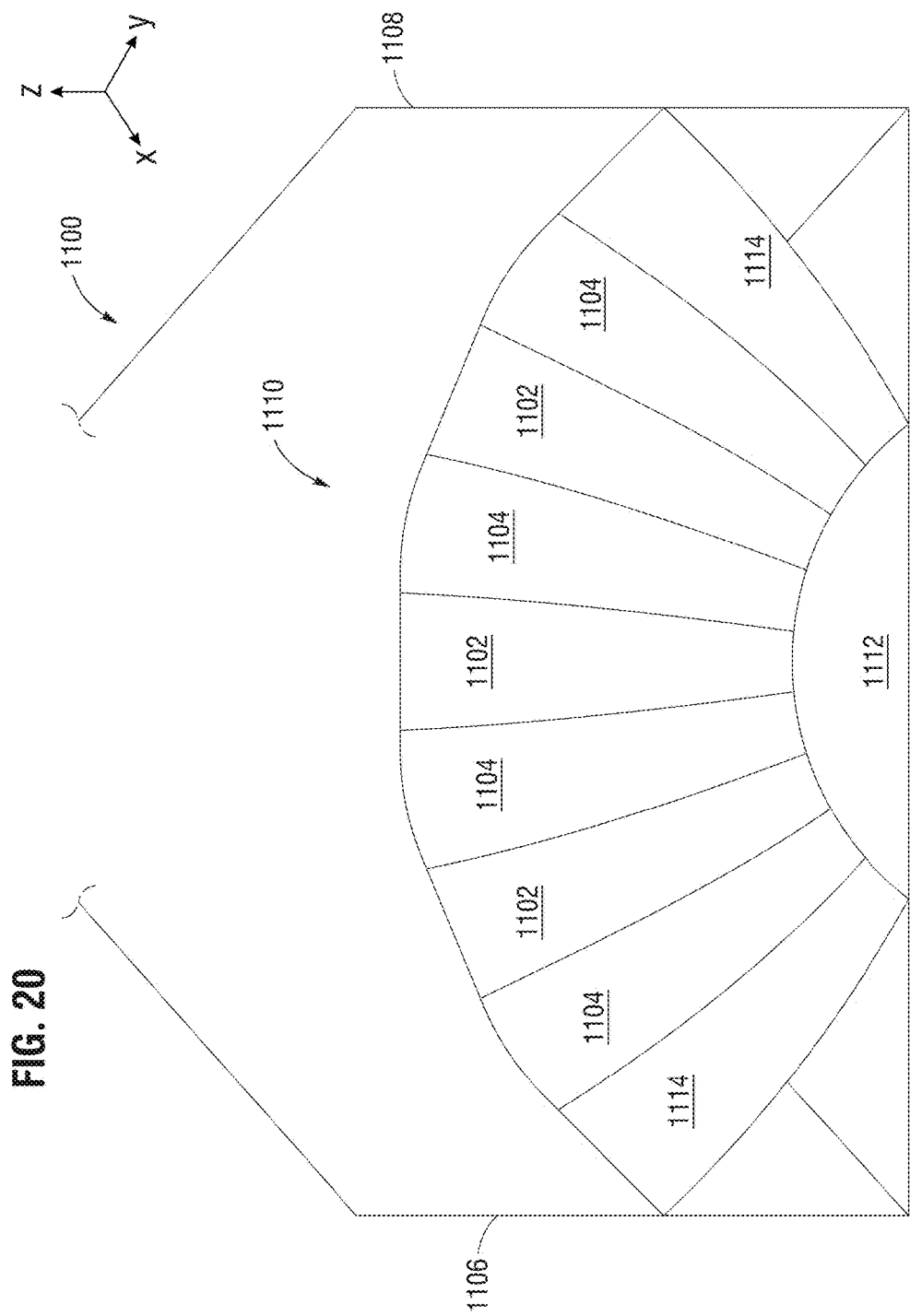
FIG. 20 is a perspective view of another embodiment of a cyclorama.

FIG. 20 illustrates another embodiment of a cyclorama 1100 including a plurality of alternating first and second panel members 1102, 1104 arranged between two angled walls 1106, 1108 to form a curved cove structure 1110. The first panel members 1102 can be curved in the Y-Z plane while being straight in the X-Y plane. The second panel members 1104 can be curved in the Y-Z plane and curved in the X-Y plane. In some embodiments, the second panel members 1104 can have a degree of curvature in the X-Y plane similar to the degree of curvature described above with respect to the side portions of the corner panel member 114 and the wall-to-wall panel members 112. In some embodiments, the degree of curvature can be from about 5 degrees to about 45 degrees, about 10 degrees to about 30 degrees, or about 22 degrees. In this manner, the curvature of the second panel members 1104 in the X-Y plane can be additive such that the combined curvature of the second panel members is substantially equal to an angle defined between the walls 1106, 1108 (e.g., about 90 degrees). In some embodiments, the second panel members can include peripheral side portions extending along a length of the panel members (e.g., in the z-direction) that are not curved in the X-Y plane. These peripheral side portions can interface with the first panel members 1102, and can be taped and mudded to conceal the interface of the first and second panel members. The cyclorama can also include one or more floor-to-wall panel members 1114 extending between the floor 1112 and the respective walls 1106, 1108.

By arranging the first and second panel members 1102, 1104 in an alternating fashion, the cyclorama can provide the illusion of an unlimited space and can render the curvature of the cove structure 1110 substantially undiscernable. More specifically, by arranging the second panel members 1104 alternatingly with the first panel members 1102, the straight profile of the first panel members in the X-Y plane can make the relatively low degree of curvature of the second panel members in the X-Y plane difficult or impossible to discern. This, in turn, can provide the illusion that the curved corner structure 1110 is not curved. Additional panel members corresponding to the first and second panel members 1102, 1104 can be arranged on top of the first and second panel members in the cove structure, where the panel members corresponding to the first panel members are rectangular and the panel members corresponding to the second panel members are curved in the X-Y plane.

In some embodiments, the first and second panel members can have radii of curvature in the Y-Z plane similar to the embodiment of FIG. 1 described above. In some embodiments, the second panel members can have radii of curvature in the X-Y plane. In some embodiments, the radii of curvature of the second panel members in the X-Y plane can be different from or unequal to the radii of curvature in the Y-Z plane. In some embodiments, respective first and second panel members of the curved corner structure 1110 can be a single unitary construction.

Example 1

Exemplary cyclorama embodiments used by, for example, Adidas America, Inc., the University of South Florida, the University of Tennessee, and PBS Hawaii in photography and film production include a corner panel member 114 described above, two wall-to-wall panel members 112 positioned one on top of the other above the corner panel member, and seven floor-to-wall panel members 110. Four floor-to-wall panel members were positioned on one side of the corner panel member, and three floor-to-wall panel members were positioned on the opposite side of the corner panel member. The radii $R_{1A}$ of the corner panel members were between about 18 inches and about 60 inches, and the radii $R_{1B}$ were between about 21 inches and 72 inches.

Third Representative Embodiment

FIGS. 21-24 illustrate another representative embodiment of a panel member 1200 for a cyclorama. The panel member 1200 can include a cove portion 1202 defined by a first wall portion 1204, a second wall portion 1206, and a third wall portion 1208. A fourth wall portion 1210 can be coupled to the second wall portion 1206 and a fifth wall portion 1212 can be coupled to the third wall portion 1208 such that the wall portions 1204-1212 together define a subject area 1214, which can be configured, for example, to receive an object to be photographed. In some embodiments, a floor portion 1216 can extend between the wall portions 1204-1212 in the subject area 1214.

Figure 21:
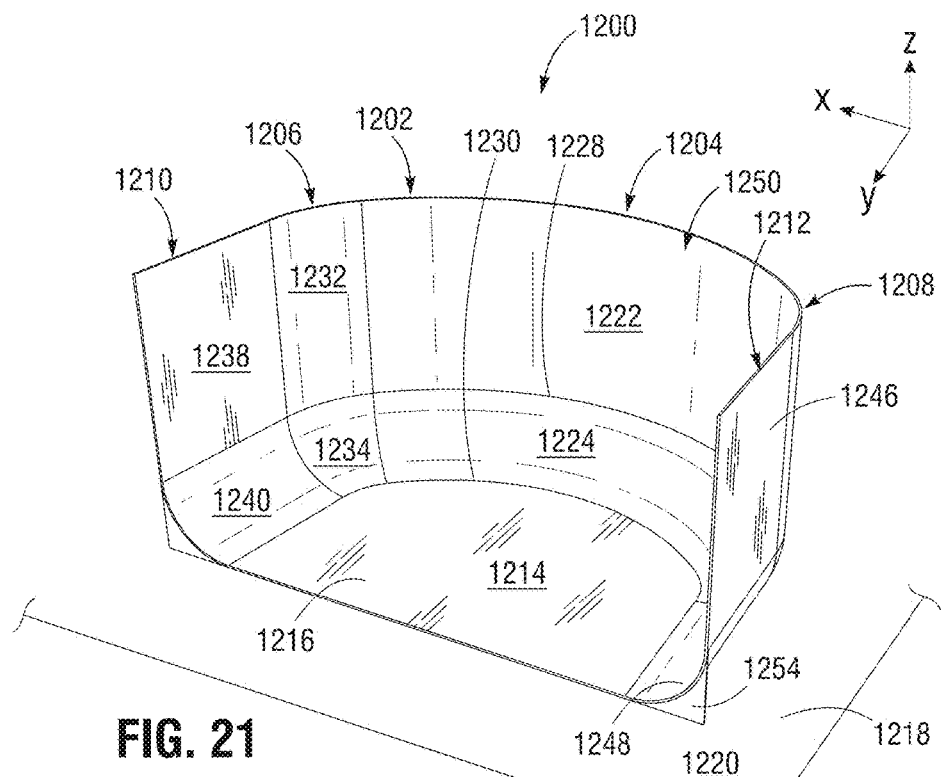
FIG. 21 is a perspective view of another embodiment of a panel member for a cyclorama.
Figure 22:
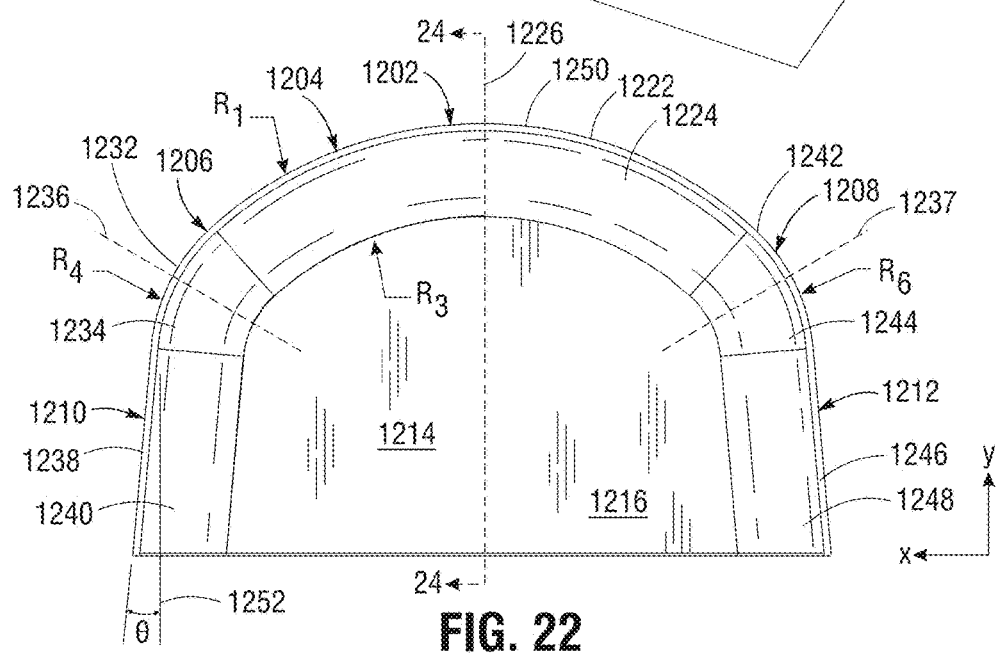
FIG. 22 is a top plan view of the panel member of FIG. 21.
Figure 24:
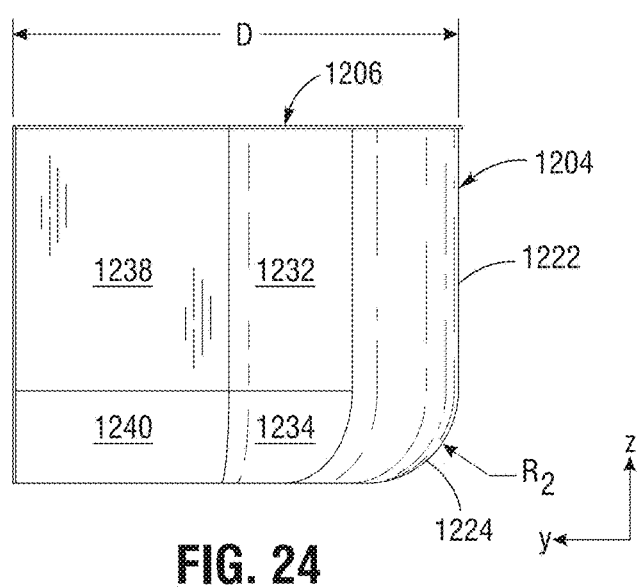
FIG. 24 is a section view of the panel member of FIG. 21 taken along plane 1226 of FIG. 22.

With reference to FIG. 21, the panel member 1200 can be configured to be situated on a horizontal reference 1218, such as a floor, a table, or other horizontal surface. The horizontal reference 1218 can define an X-Y plane 1220 that is parallel to the horizontal reference. The first wall portion 1204 can include an upper portion 1222 and a lower portion 1224. As shown in FIG. 22, the upper portion 1222 of the first wall portion 1204 can have a radius of curvature $R_1$ in the X-Y plane 1220. Meanwhile, the lower portion 1224 can be curved in the X-Y plane 1220 and in a Y-Z plane 1226 (e.g., shown bisecting the first wall portion 1204 in FIG. 22) that is perpendicular to the horizontal reference 1218. The lower portion 1224 can have a radius of curvature $R_2$ in the Y-Z plane 1226, as best shown in FIG. 24. In this manner, the lower portion 1224 can curve upwardly from the horizontal reference 1218 to the upper portion 1222 to provide the illusion of an infinite space. This can also cause an upper edge or boundary 1228 of the lower portion 1224 to have the radius $R_1$ in the X-Y plane 1220, while a lower edge 1230 of the lower portion 1224 has a radius of curvature $R_3$ in the X-Y plane (FIG. 22) that is less than the radius $R_1$.

In some examples, a ratio of the radii $R_1:R_3$ can be from about 3:1 to about 1.2:1. In some examples, a ratio of the radii $R_1:R_2$ can be from about 2:1 to about 10:1. In some examples, the ratio of the radii $R_1:R_2$ can be from about 3:1 to about 6:1. In the illustrated embodiment, the ratio of the radii $R_1:R_2$ is about 4.5:1.

Referring again to FIGS. 21 and 22, the second wall portion 1206 is located between and coupled to the first wall portion 1204 and the fourth wall portion 1210. The second wall portion 1206 can have an upper portion 1232 and a lower portion 1234. The upper portion 1232 can have a radius of curvature $R_4$ in the X-Y plane 1220, and the lower portion 1234 can have a radius of curvature $R_5$ (FIG. 23) in a Y-Z plane 1236 that is defined with respect to the second wall portion 1206 (e.g., shown bisecting the second wall portion 1206 in FIG. 22), and that is perpendicular to the horizontal reference 1218. In the illustrated embodiment, the radius $R_1$ of the upper portion 1222 of the first wall portion 1204 is greater than the radius $R_4$ of the upper portion 1232 of the second wall portion 1206. For example, in some embodiments the ratio $R_1:R_4$ can be greater than or equal to 1.5:1. In some embodiments, the ratio $R_1:R_4$ can be greater than or equal to 2:1. In the illustrated embodiment, the ratio $R_1:R_4$ is about 2.25:1, although it should be understood that the radii $R_1$ and $R_4$ can have any suitable ratio.

The fourth wall portion 1210 can include an upper portion 1238 and a lower portion 1240. In the illustrated embodiment, the lower portion 1240 has a radius of curvature in a vertical plane similar to the radii $R_2$ and $R_5$, while the upper portion 1238 is planar, and is perpendicular to the horizontal reference 1218.

Referring again to FIG. 22, an upper portion 1242 of the third wall portion 1208 can have a radius of curvature $R_6$ in the X-Y plane 1220. In the illustrated embodiment, the radius $R_6$ of the third wall portion 1208 is equal to the radius $R_4$ of the second wall portion 1206, although other configurations are possible. The third wall portion 1208 can also have a lower portion 1244 that has a radius of curvature in a Y-Z plane 1237 (e.g., shown bisecting the third wall portion 1208) that is perpendicular to the horizontal reference 1218. In some embodiments, the radius of curvature of the lower portion 1244 in the Y-Z plane 1237 can be equal to the radius $R_2$ (FIG. 24), similar to the second wall portion 1206. The fifth wall portion 1212 can also have an upper portion 1246 that is planar, and a lower portion 1248 that is curved in a vertical plane, similar to the fourth wall portion 1210. In this manner, the cyclorama 1200 can be symmetrical about the Y-Z plane 1226.

The wall portions 1204, 1206, 1208, 1210, 1212 and the floor portion 1216 can be integrally formed with one another, or separately formed and coupled together using, for example, fasteners or adhesive. The wall portions can be made of, for example, plastic (e.g., ABS plastic), foam, metal, fiberglass, resin, wood, or any other suitable material. In the illustrated embodiment, the cyclorama can include tab portions 1254 extending from the fourth and fifth wall portions 1210, 1212 and configured to contact the surface on which the panel member 1200 is situated in order to provide stability. In some embodiments, the panel member 1200 can be made by molding a moldable material on a mold having a surface comprising the shape of the panel member, similar to the molds of FIGS. 10-12.

The panel member 1200 of FIGS. 21-24 can provide a number of significant advantages over known cycloramas. For example, the upper portions 1222, 1232, and 1242 of the respective first, second, and third wall portions 1204, 1206, 1208 can form a cove wall 1250 with a compound curvature in the X-Y plane 1220 comprising the radius $R_1$ of the first wall portion 1204, the radius $R_4$ of the second wall portion 1206, and the radius $R_6$ of the third wall portion 1208. One significant advantage of this configuration is that by incorporating the radii $R_4$ and $R_6$, which are smaller than the radius $R_1$, into the cove portion 1202, the transition from the curved first wall portion 1204 to the straight fourth and fifth wall portions 1210, 1212 can be made more gradual, and abrupt changes in curvature of the walls can be avoided. This can reduce shadows and bright spots associated with abrupt changes in curvature of the walls of the panel member, thereby promoting more even lighting of the panel member and of the subject area 1214.

Figure 25:
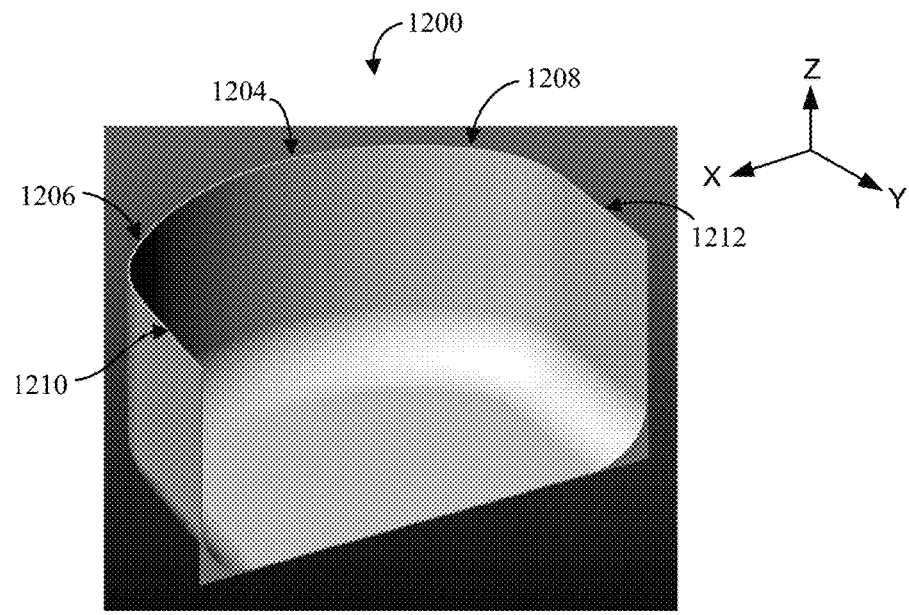
FIG. 25 is a perspective view of the panel member of FIG. 21 illustrating the reduction of shadows at junctions between the various wall portions achievable with the illustrated configuration.
Figure 26:
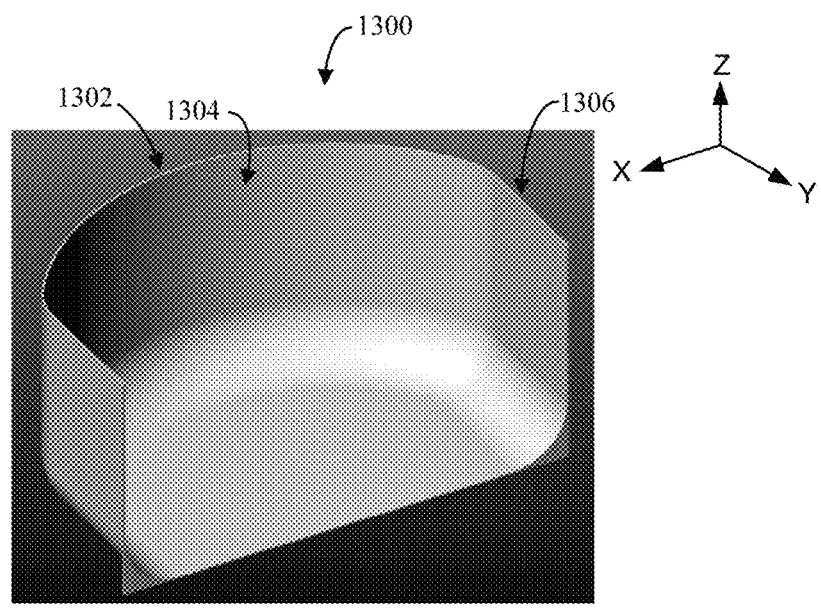
FIG. 26 is a perspective view of another embodiment of a panel member for a cyclorama illustrating shadows created at a junction of a curved wall portion and a straight wall portion.

This concept is illustrated in FIGS. 25 and 26. FIG. 25 illustrates the panel member 1200 lit evenly from all directions. FIG. 26 illustrates a panel member 1300 in similar lighting. The panel member 1300 includes a wall portion 1302 having an upper portion 1304 with a radius of curvature in an X-Y plane that is parallel to a horizontal reference, similar to the first wall portion 1204. The wall portion 1302 is directly coupled to a wall portion 1306 that is not curved in the X-Y plane, similar to the fifth wall portion 1212 of FIG. 25. In FIG. 25, only a slight change in brightness is visible at the junction between the third wall portion 1208 and the fifth wall portion 1212, owing to the compound curvature of the cove wall. However, a significant change of brightness is visible in FIG. 26 at the location where the wall portion 1302 is coupled to the wall portion 1306. This is because the curvature of the upper portion 1304 of the wall portion 1302 abruptly transitions to the straight wall portion 1306. Such undesirable lighting effects can be reduced or eliminated by including wall portions, such as the second and third wall portions 1206, 1208, with upper portions having radii of curvature in a plane parallel to a horizontal reference (e.g., the X-Y plane) that are less than the radius of curvature of the upper portion of the first wall portion 1204, as in the embodiment of FIGS. 21-24.

Incorporating the second and third wall portions 1206, 1208 having the radii $R_4$ and $R_6$ into the panel member 1200 can also allow the radius $R_1$ of the first wall portion 1204 to be larger than known cyclorama panel members. Making the radius $R_1$ larger can allow the first wall portion 1204 to diffuse light more evenly through the subject area 1214. Another advantage of the embodiment of FIGS. 21-24 is that the relatively large radius $R_1$, in combination with the smaller radii $R_4$ and $R_6$, also allows the fourth and fifth wall portions 1210, 1212 to form an angle of less than 90 degrees while preserving the relatively large subject area 1214, and without producing substantial shadowing effects. With reference to FIG. 22, the fourth wall portion 1210 forms an angle $\theta$ of about 5 degrees with a reference axis 1252 that is parallel to the Y-Z plane 1226. The fifth wall portion 1212 can be symmetrical with the fourth wall portion 1210 such that the fourth and fifth wall portions 1210, 1212 form an angle of about 10 degrees. This provides the advantage of widening the subject area 1214, while reducing the difference in curvature at the interface of the second wall portion 1206 with the fourth wall portion 1210, and at the interface of the third wall portion 1208 and the fifth wall portion 1212. However, it should be understood that the fourth and fifth wall portions 1210, 1212 can form any suitable angle, such as from about 5 degrees to about 90 degrees, or from about 5 degrees to about 30. In other embodiments, the fourth and fifth wall portions 1210, 1212 can be parallel to one another, as desired.

Figure 27:
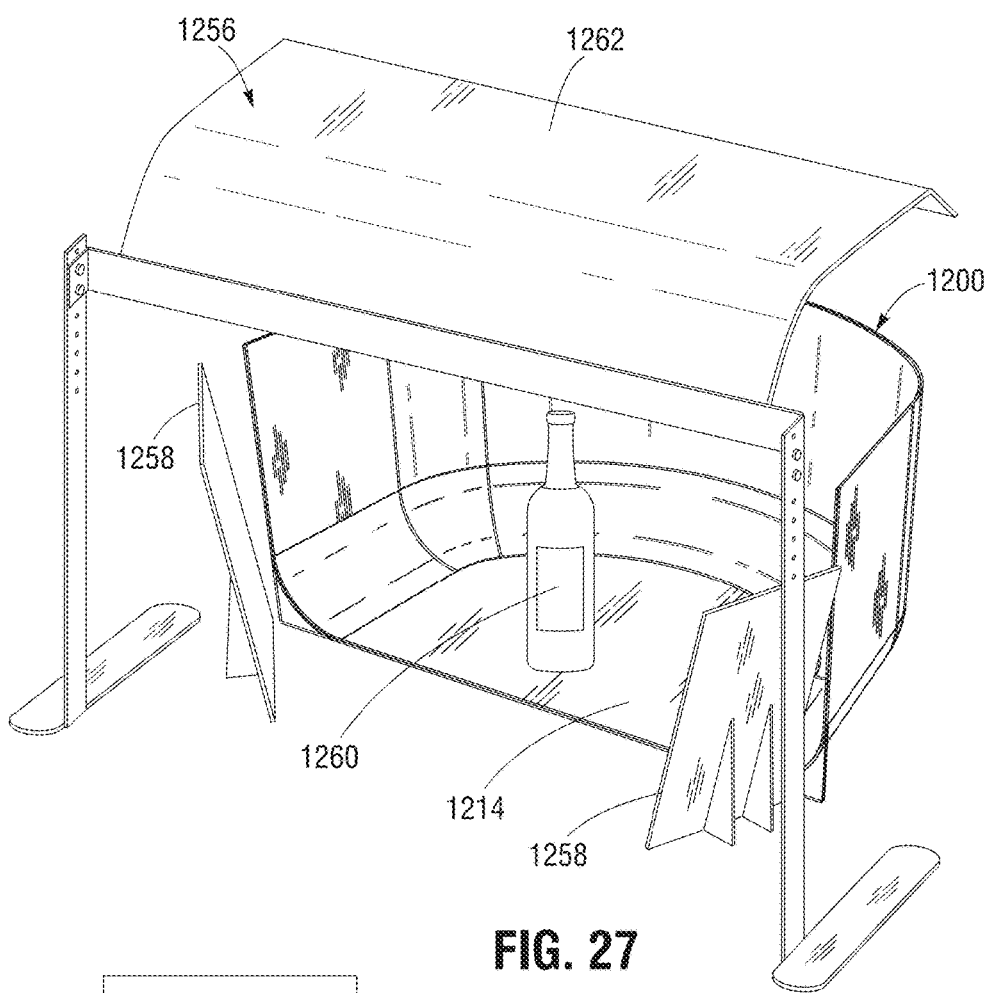
FIG. 27 is a perspective view of the panel member of FIG. 21 illustrating a subject in the subject area in combination with lighting elements and bounce cards.
Figure 28:
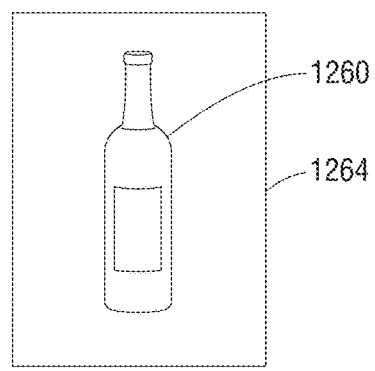
FIG. 28 illustrates an image of a subject in the subject area of the panel member of FIG. 27.

The panel member of FIGS. 21-24 can be used in combination with a variety of peripheral elements to create a studio, including integral or standalone lighting (e.g., mounted on stands placed in front of or around the subject area 1214), one or more light-reflecting placards or "bounce cards" that can be located in or around the perimeter of the subject area 1214, and/or a cover that can be situated above the subject area to reflect light into the subject area. An exemplary configuration is illustrated in FIG. 27, in which the panel member 1200 is shown in combination with an independently configurable lighting assembly 1256, and two bounce cards 1258 arranged one on either side of the subject area 1214. A subject 1260 (e.g., a product to be photographed) is shown situated in the subject area 1214. In the illustrated embodiment, the lighting assembly 1256 can include a cover member 1262 configured to be situated over the subject area to reflect light from the lighting assembly into the subject area from above. In this manner, the subject 1260 can be photographed in the subject area 1214 to create an image 1264 of the subject 1260 in which the wall portions of the panel member 1200 provide the illusion of an infinite space, as shown in FIG. 28. In alternative embodiments, the panel member 1200 can be used in combination with a cover member that rests on top of the wall portions.

Example 2

Figure 23:
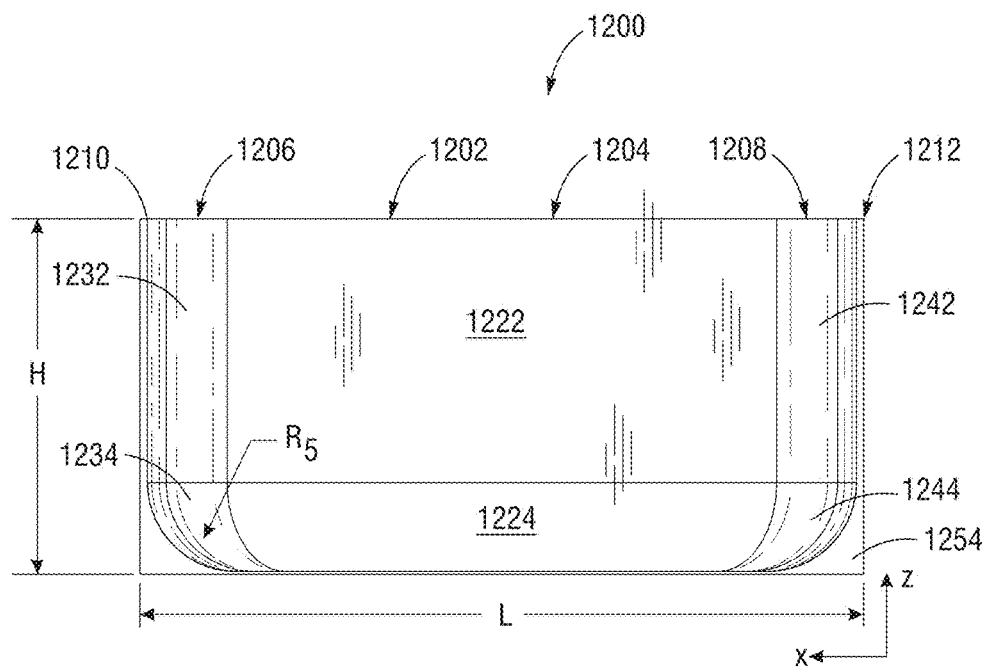
FIG. 23 is a front elevation view of the panel member of FIG. 21.

In a representative example of the panel member of FIGS. 21-24, the panel member 1200 is sized to be situated on a horizontal reference, such as a floor or a table. With reference to FIGS. 23 and 24, a length L defined between the edges of the fourth and fifth wall portions 1210, 1212 can be about 31.5 inches. A height H of the panel member can be about 15.5 inches, and a depth D measured from the front edge of the floor portion 1216 to an apex of the first wall portion 1204 can be about 19.5 inches. The radius of curvature $R_1$ of the upper portion 1222 of the first wall portion 1204 can be about 18 inches, and the radius of curvature $R_2$ of the lower portion 1224 can be about 4 inches. The radius of curvature $R_3$ of the lower edge of the lower portion 1224 can be about 9 inches. The radii of curvature $R_4$ and $R_6$ of the upper portions 1232 and 1242 of the second and third wall portions 1206, 1208, respectively, can be about 8 inches. Meanwhile, the radius $R_5$ of the lower portion 1234 of the second wall portion 1206 can be 4 inches, similar to the radius $R_2$. However, in other embodiments, the various radii can be larger or smaller, as desired, and the wall portions 1210, 1212 can be longer or shorter in proportion to the cove 1250, as desired.

Additionally, in some embodiments, the upper portions of the respective wall portions can have the same height, and the lower portions of the respective wall portions can have the same height. In this manner, the upper edges of the lower portions, such as the edge 1228 of the lower portion 1224 of the first wall portion 1204, can be contiguous with one another, as shown in FIG. 21.

General Considerations

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. As used herein, the terms "a", "an" and "at least one" encompass one or more of the specified element. That is, if two of a particular element are present, one of these elements is also present and thus "an" element is present. The terms "a plurality of" and "plural" mean two or more of the specified element.

As used herein, the term "and/or" used between the last two of a list of elements means any one or more of the listed elements. For example, the phrase "A, B, and/or C" means "A," "B," "C," "A and B," "A and C," "B and C" or "A, B and C."

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

As used herein, the term "coupled" generally means physically coupled or linked and does not exclude the presence of intermediate elements between the coupled items absent specific contrary language.

As used herein, the terms "integrally formed" and "unitary construction" refer to a construction that does not include any welds, fasteners, or other means for securing separately formed pieces of material to each other.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

Some of the figures provided herein include an orientation system that includes an x-axis, a y-axis, and a z-axis that are mutually orthogonal to one another. It should be understood that the orientation system is merely for reference and can be varied. For example, the x-axis can be switched with the y-axis and/or the object or assembly can be rotated.

As used herein, the term "X-Y plane" refers to a plane defined by an x-axis and a y-axis that extend along an absolute horizontal reference, such as a floor on which a panel member is situated when in a functional position, such that the plane is parallel to the absolute horizontal reference.

As used herein, the term "Y-Z plane" refers to a plane defined by the y-axis of the X-Y plane and a z-axis that is mutually orthogonal to the x- and y-axes, and that is perpendicular to the absolute horizontal reference.

As used herein, "curved in the X-Y plane" means that a two-dimensional projection of a body or a portion of the body, such as a panel member, onto the X-Y plane has a curved profile.

As used herein, "curved in the Y-Z plane" means that a two-dimensional projection of a body or a portion of the body, such as a panel member, onto a Y-Z plane of the body has a curved profile.

As used herein, the term "degree of curvature" refers to an angle of an arc defined by the surface of a curved portion of a panel member.

In view of the many possible embodiments to which the principles of the disclosure may be applied, it should be recognized that the illustrated embodiments are only preferred examples and should not be taken as limiting the scope of the disclosure. Rather, the scope of the disclosure is at least as broad as the following claims.

What is claimed is:

1. A panel member for a cyclorama configured to be situated on a horizontal reference, the panel member comprising:
   a first concavo-convex wall portion having an upper portion and a lower portion, the upper portion having a first radius of curvature in a plane that is parallel to the horizontal reference, at least the lower portion having a second radius of curvature in a plane that is perpendicular to the horizontal reference such that the lower portion is configured to slope upwardly from the horizontal reference when the cyclorama is situated on the horizontal reference; and
   a second concavo-convex wall portion, the second wall portion having an upper portion and a lower portion, the upper portion having the first radius of curvature in a plane that is parallel to the horizontal reference, at least the lower portion having the second radius of curvature in a plane that is perpendicular to the horizontal reference such that the lower portion is configured to slope upwardly from the horizontal reference when the cyclorama is situated on the horizontal reference;
   wherein the first radius of curvature is greater than the second radius of curvature.

2. The panel member of claim 1, wherein a ratio of the first radius of curvature to the second radius of curvature is from about 1.1:1 to about 2:1, from about 1.1:1 to about 1.5:1, or about 1.2:1.

3. The panel member of claim 1, wherein the first and second wall portions further comprise respective first and second peripheral recessed portions on the same side of the panel member as a primary surface of the panel member.

4. The panel member of claim 3, wherein the first and second peripheral recessed portions define respective secondary surfaces that are offset from the primary surface of the panel member in a direction toward a support structure to which the panel member is secured when situated in a use position.

5. The panel member of claim 4, wherein the secondary surfaces define a plurality of openings to receive fasteners for fastening the panel member to the support structure.

6. The panel member of claim 1, further comprising flanges extending along the first and second wall portions perpendicular to a primary surface of the panel member.

7. The panel member of claim 6, wherein the flanges further define openings to receive fasteners for fastening the panel member to one or more adjacent panel members.

8. The panel member of claim 1, wherein the first and second wall portions define respective degrees of curvature of from about 30 degrees to about 60 degrees.

9. The panel member of claim 1, wherein the first and second wall portions are integrally formed with one another.

10. The panel member of claim 1, further comprising a third concavo-convex wall portion located between the first and second wall portions, the third wall portion having an upper portion and a lower portion, the upper portion having an upper edge that extends linearly in a plane that is parallel to the horizontal reference, at least the lower portion having the second radius of curvature in a plane that is perpendicular to the horizontal reference.

11. The panel member of claim 1, further comprising a third concavo-convex wall portion located between the first and second wall portions, the third wall portion having an upper portion and a lower portion, the upper portion having a third radius of curvature in a plane that is parallel to the horizontal reference, at least the lower portion having the second radius of curvature in a plane that is perpendicular to the horizontal reference.

12. The panel member of claim 11, wherein the third radius of curvature is larger than the first radius of curvature.

13. The panel member of claim 12, wherein a ratio of the first radius of curvature to the third radius of curvature is greater than 1.5:1, greater than 2:1, or about 2.25:1.

14. The panel member of claim 11, further comprising a fourth wall portion extending from the first wall portion and a fifth wall portion extending from the second wall portion, the fourth and fifth wall portions including respective upper and lower portions, the respective upper portions being planar.

15. The panel member of claim 14, wherein an angle defined by the upper portions of the fourth and fifth wall portions is less than 90 degrees.

16. The panel member of claim 14, further comprising a floor portion extending between the first, second, third, fourth, and fifth wall portions.

17. A method of making a panel member for a cyclorama, comprising:
applying a moldable material to a mold member; and
applying pressure to the moldable material to form a panel member configured to be situated on a horizontal reference, the panel member comprising:
a first concavo-convex wall portion having an upper portion and a lower portion, the upper portion having a first radius of curvature in a plane that is parallel to the horizontal reference, at least the lower portion having a second radius of curvature in a plane that is perpendicular to the horizontal reference such that the lower portion is configured to slope upwardly from the horizontal reference when the cyclorama is situated on the horizontal reference; and
a second concavo-convex wall portion, the second wall portion having an upper portion and a lower portion, the upper portion having the first radius of curvature in a plane that is parallel to the horizontal reference, at least the lower portion having the second radius of curvature in a plane that is perpendicular to the horizontal reference such that the lower portion is configured to slope upwardly from the horizontal reference when the cyclorama is situated on the horizontal reference;
wherein the first radius of curvature is greater than the second radius of curvature.

18. The method of claim 17, wherein the panel member further comprises a third concavo-convex wall portion located between the first and second wall portions, the third wall portion having an upper portion and a lower portion, the upper portion having an upper edge that extends linearly in a plane that is parallel to the horizontal reference, at least the lower portion having the second radius of curvature in a plane that is perpendicular to the horizontal reference.

19. The method of claim 17, wherein the panel member further comprises a third concavo-convex wall portion located between the first and second wall portions, the third wall portion having an upper portion and a lower portion, the upper portion having a third radius of curvature in a plane that is parallel to the horizontal reference, at least the lower portion having the second radius of curvature in a plane that is perpendicular to the horizontal reference.

20. A method comprising creating an image using a cyclorama including a panel member configured to be situated on a horizontal reference, the panel member comprising:
a first concavo-convex wall portion having an upper portion and a lower portion, the upper portion having a first radius of curvature in a plane that is parallel to the horizontal reference, at least the lower portion having a second radius of curvature in a plane that is perpendicular to the horizontal reference such that the lower portion is configured to slope upwardly from the horizontal reference when the cyclorama is situated on the horizontal reference; and
a second concavo-convex wall portion, the second wall portion having an upper portion and a lower portion, the upper portion having the first radius of curvature in a plane that is parallel to the horizontal reference, at least the lower portion having the second radius of curvature in a plane that is perpendicular to the horizontal reference such that the lower portion is configured to slope upwardly from the horizontal reference when the cyclorama is situated on the horizontal reference;
wherein the first radius of curvature is greater than the second radius of curvature.

* * * * *